(12) United States Patent
Hwang et al.

(10) Patent No.: US 9,894,422 B2
(45) Date of Patent: Feb. 13, 2018

(54) METHOD AND APPARATUS FOR TRANSRECEIVING BROADCAST SIGNAL FOR PANORAMA SERVICE

(71) Applicant: LG ELECTRONICS INC., Seoul (KR)

(72) Inventors: Soojin Hwang, Seoul (KR); Jongyeul Suh, Seoul (KR); Hyunmook Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/112,344

(22) PCT Filed: Feb. 17, 2015

(86) PCT No.: PCT/KR2015/001606
§ 371 (c)(1),
(2) Date: Jul. 18, 2016

(87) PCT Pub. No.: WO2015/126144
PCT Pub. Date: Aug. 27, 2015

(65) Prior Publication Data
US 2016/0337706 A1 Nov. 17, 2016

Related U.S. Application Data

(60) Provisional application No. 61/940,838, filed on Feb. 18, 2014.

(51) Int. Cl.
*H04N 21/6379* (2011.01)
*H04N 21/47* (2011.01)
(Continued)

(52) U.S. Cl.
CPC ..... *H04N 21/6379* (2013.01); *H04N 5/23238* (2013.01); *H04N 19/117* (2014.11);
(Continued)

(58) Field of Classification Search
None
See application file for complete search history.

(56) References Cited

U.S. PATENT DOCUMENTS

| 5,130,794 A | * 7/1992 | Ritchey ..... F41G 7/30 348/383 |
| 6,859,557 B1 | 2/2005 | Uyttendaele et al. |

(Continued)

FOREIGN PATENT DOCUMENTS

| JP | 2004-3280204 A | 11/2004 |
| JP | 2009-510888 A | 3/2009 |

(Continued)

OTHER PUBLICATIONS

Yeong Baek Kim et al., "Performance Improvement for Streaming of High Capacity Panoramic Video", Journal of Korean Society for Internet Information, vo. 11 No. 2, Apr. 2010.

(Continued)

*Primary Examiner* — Justin Shepard
(74) *Attorney, Agent, or Firm* — Dentons US LLP

(57) ABSTRACT

The present invention relates to a providing a method and/or an apparatus for transceiving a broadcast signal for a panorama broadcast service. The method for transmitting a broadcast signal, according to one embodiment of the present invention, comprises the steps of: encoding an image, multiplexing into a single broadcast stream, the encoded image and signaling information related to the image, wherein the signaling information includes signaling information related to a panoramic image; generating a broadcast signal including the multiplex broadcast stream; and transmitting the generated broadcast signal.

16 Claims, 27 Drawing Sheets

(51) Int. Cl.

| | |
|---|---|
| H04N 21/2362 | (2011.01) |
| H04N 5/232 | (2006.01) |
| H04N 21/4722 | (2011.01) |
| H04N 21/236 | (2011.01) |
| H04N 21/472 | (2011.01) |
| H04N 21/2368 | (2011.01) |
| H04N 21/2365 | (2011.01) |
| H04N 21/41 | (2011.01) |
| H04N 21/81 | (2011.01) |
| H04N 19/167 | (2014.01) |
| H04N 19/136 | (2014.01) |
| H04N 19/44 | (2014.01) |
| H04N 21/438 | (2011.01) |
| H04N 21/61 | (2011.01) |
| H04N 19/119 | (2014.01) |
| H04N 19/61 | (2014.01) |
| H04N 19/117 | (2014.01) |
| H04N 19/17 | (2014.01) |
| H04N 21/234 | (2011.01) |
| H04N 21/4728 | (2011.01) |

(52) U.S. Cl.
CPC ......... *H04N 19/119* (2014.11); *H04N 19/136* (2014.11); *H04N 19/167* (2014.11); *H04N 19/17* (2014.11); *H04N 19/44* (2014.11); *H04N 19/61* (2014.11); *H04N 21/236* (2013.01); *H04N 21/2362* (2013.01); *H04N 21/2365* (2013.01); *H04N 21/2368* (2013.01); *H04N 21/23418* (2013.01); *H04N 21/23614* (2013.01); *H04N 21/4122* (2013.01); *H04N 21/4382* (2013.01); *H04N 21/47* (2013.01); *H04N 21/472* (2013.01); *H04N 21/4722* (2013.01); *H04N 21/6125* (2013.01); *H04N 21/8153* (2013.01); *H04N 21/234* (2013.01); *H04N 21/4728* (2013.01)

(56) References Cited

U.S. PATENT DOCUMENTS

| | | | | |
|---|---|---|---|---|
| 2004/0027452 | A1* | 2/2004 | Yun | H04N 7/17336 |
| | | | | 348/51 |
| 2007/0172133 | A1 | 7/2007 | Kim et al. | |
| 2011/0216179 | A1* | 9/2011 | Dialameh | G06F 17/30247 |
| | | | | 348/62 |
| 2012/0275022 | A1* | 11/2012 | Oh | G01B 11/026 |
| | | | | 359/466 |
| 2013/0287104 | A1* | 10/2013 | Jeong | H04N 19/00569 |
| | | | | 375/240.12 |
| 2013/0343733 | A1* | 12/2013 | Zhao | H04N 9/87 |
| | | | | 386/353 |

FOREIGN PATENT DOCUMENTS

| | | |
|---|---|---|
| JP | 2009-147893 A | 7/2009 |
| JP | 2011-234065 A | 11/2011 |
| KR | 10-2006-0118815 A | 11/2006 |
| KR | 10-2007-0034943 A | 3/2007 |
| KR | 10-2011-0001990 A | 1/2011 |
| KR | 10-2011-0018294 A | 2/2011 |
| KR | 1020120013974 A | 2/2012 |
| KR | 1020120026013 A | 3/2012 |
| KR | 1020120086661 A | 8/2012 |
| KR | 1020130077246 A | 7/2013 |
| WO | 2012/111325 A1 | 8/2012 |
| WO | 2012/157999 A2 | 11/2012 |
| WO | 2013/150945 A1 | 10/2013 |

OTHER PUBLICATIONS

International Search Report and Written Opinion from PCT/KR2015/001606, dated Apr. 30, 2015.

Kim, B., et al., "An Efficient Transmission Method of Panoramic Multimedia Contents in a Limited Bandwidth Environment," Journal of Broadcast Engineering, 16, 5, 2011, pp. 811-823.

* cited by examiner

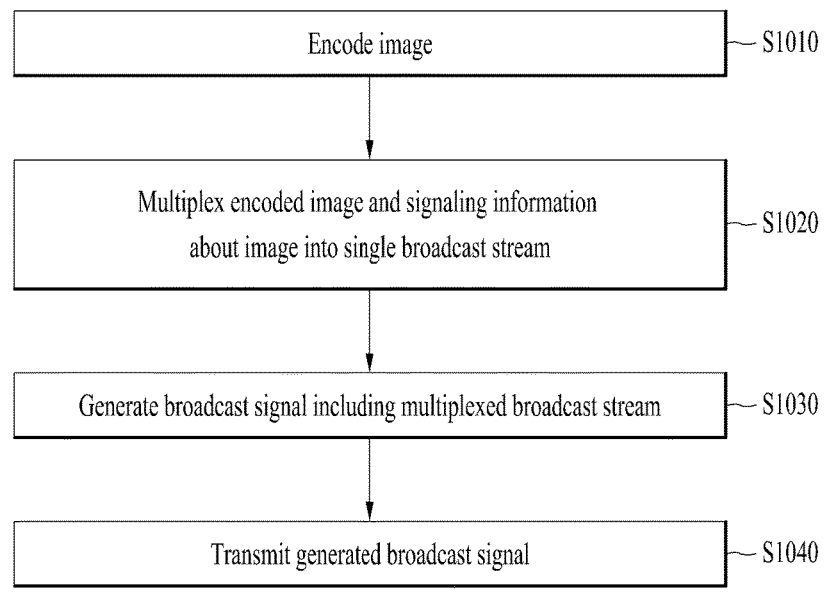
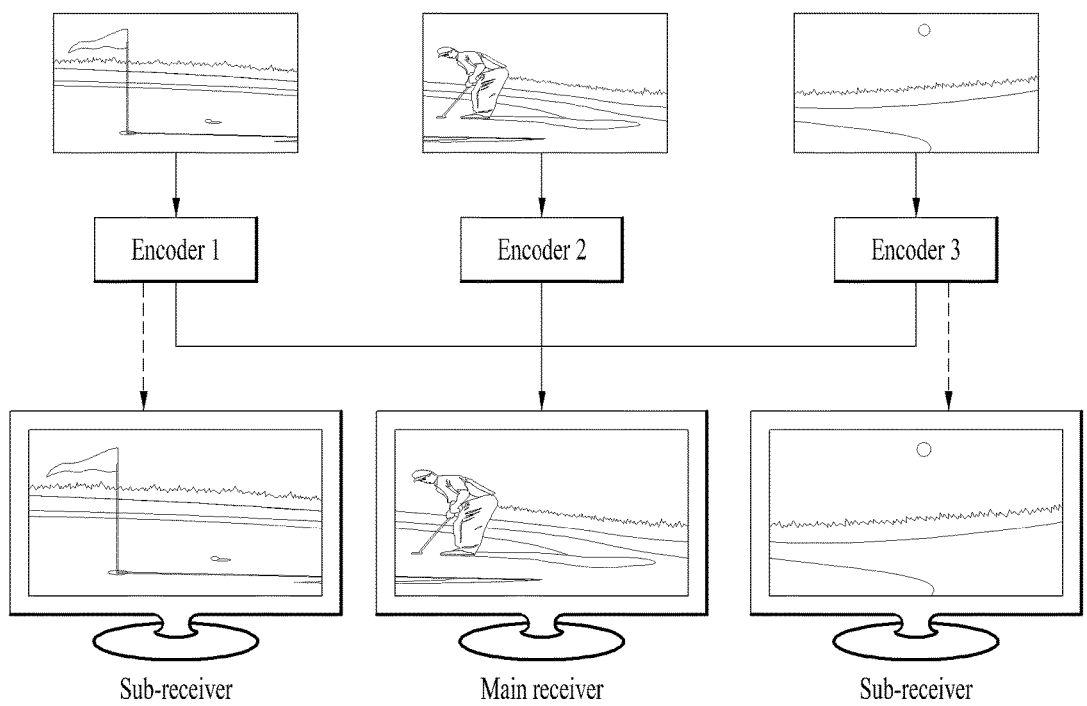

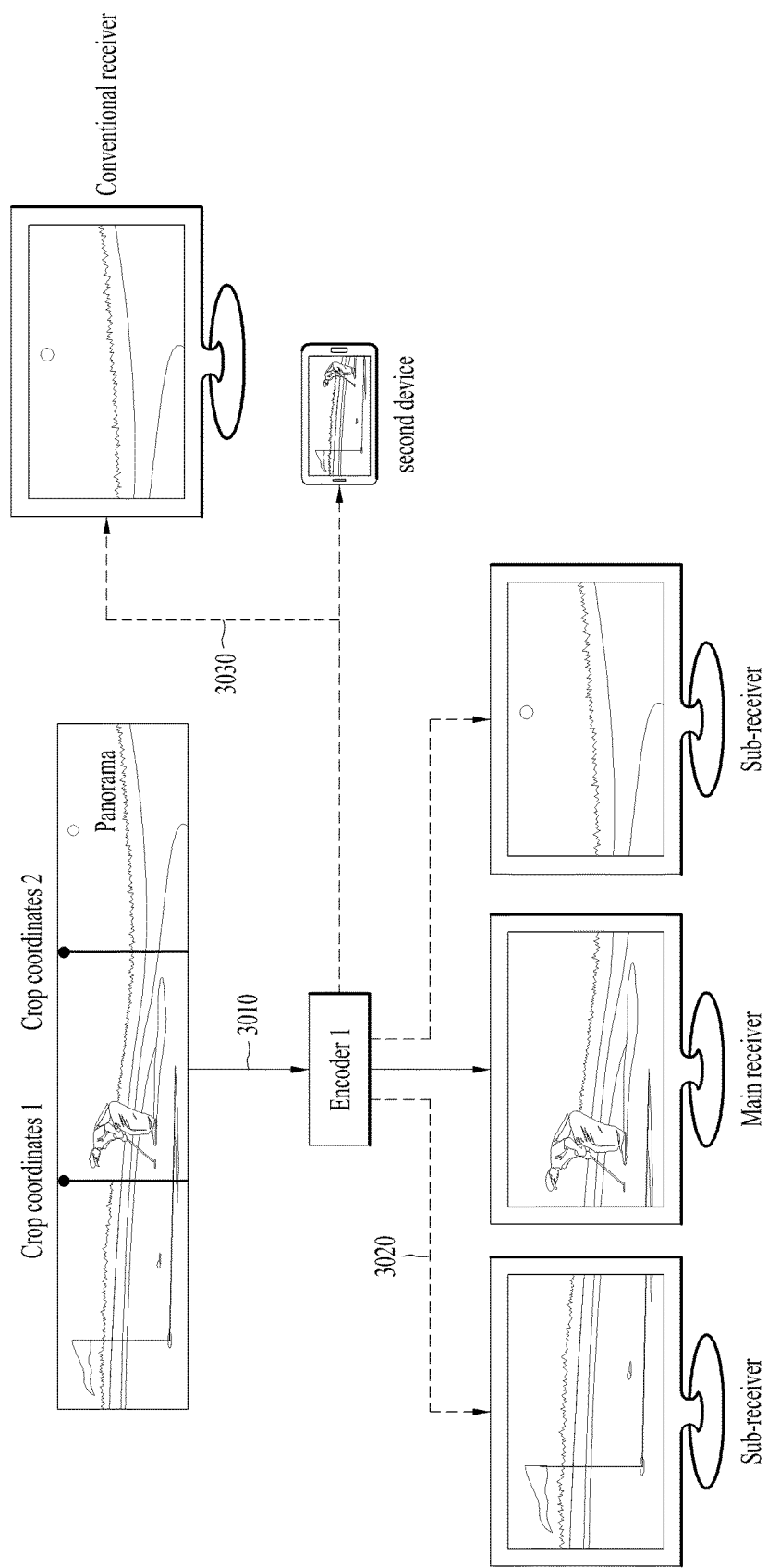

FIG. 6
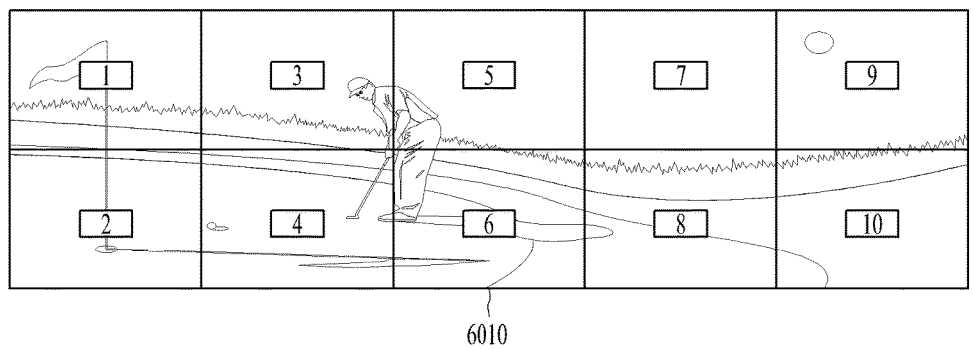
6010
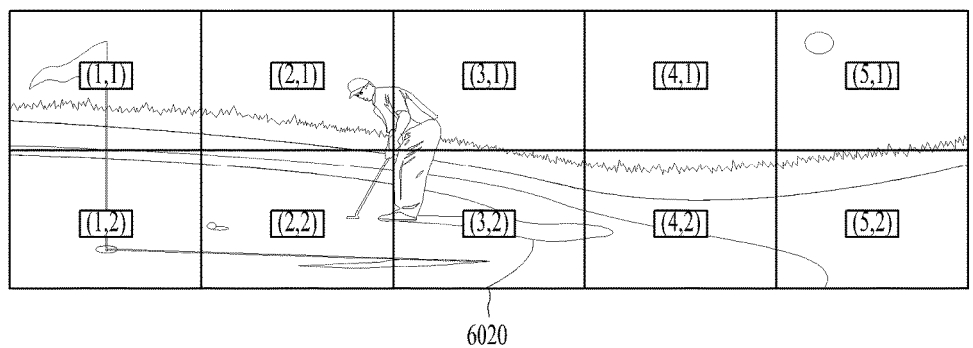
6020
FIG. 7
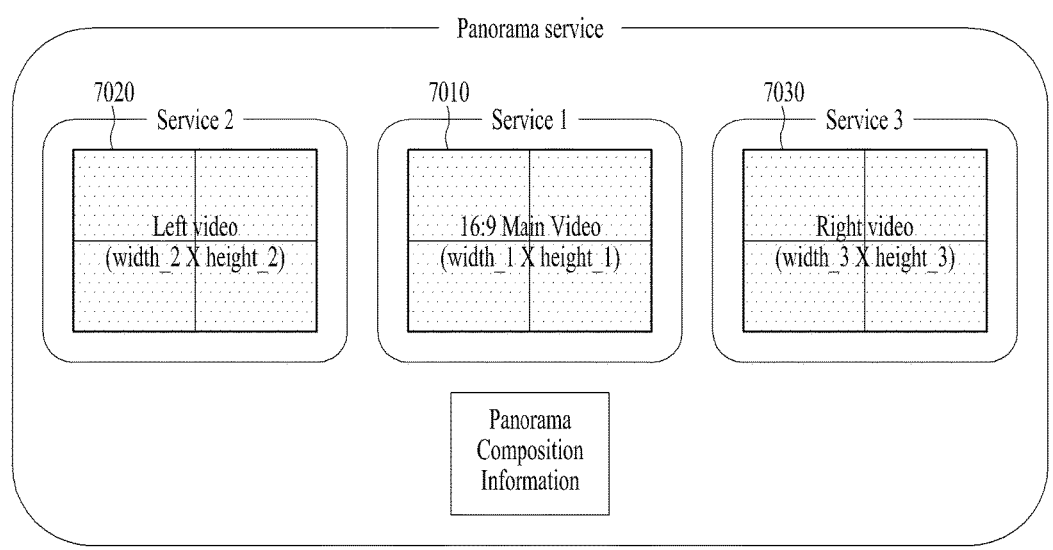

FIG. 17

| sei_payload (payloadType, payloadSize) { | Category | Descriptor |
|---|---|---|
| ... | | |
| if( payloadType == 52 ) | | |
| panorama_composition_info(payloadSize) | 5 | |

| panorama_composition_info(payloadSize) { | C | Descriptor |
|---|---|---|
| panorama_service_type | 3 | |
| panorama_composition_info_ver | 5 | |
| panorama_width_div32 | 16 | |
| panorama_height_div32 | 16 | |
| panorama_profile | 8 | |
| panorama_level | 8 | |
| panorama_tier | 2 | |
| reserved | 6 | |
| if(panorama_service_type == 1 ){<br>    panorama_stream_num<br>    panorama_view_num<br>    for(i=0; i<panorama_view_num; i++){<br>        panorama_view_priority<br>        included_stream_id<br>    }<br>    for(i=0; i<panorama_stream_num; i++)<br>        panorama_composition_metadata( )<br>        panorama_filtering_metadata( )<br>} | 1<br>2<br>5 | |
| if(panorama_service_type == 2 ){<br>    reserved<br>    cropping_region_num<br>    for(i=0; i<cropping_region_num; i++)<br>        extraction_info_metadata( )<br>} | 3<br>5 | |
| if(panorama_service_type == 4){<br>    ROI_num<br>    ROI_codec_type<br>    for(i=0; i<ROI_num; i++)<br>        ROI_info_metadata( )<br>}<br>} | 5<br>3 | |

FIG. 18

| Bit value | Description |
|---|---|
| 000 | Reserved |
| 001 | Scenario 1 : Service of dividing panoramic image into forms compatible with conventional receivers |
| 010 | Scenario 2 : Whole panoramic image + Extraction information |
| 011 | Scenario 4 : ROI reign information |
| 100 ~ 111 | Reserved |

FIG. 19

| Syntax | No. of Bits | Mnemonic |
|---|---|---|
| Panorama_composition_metadata () { | | |
|    sub_video_profile | 8 | |
|    sub_video_level | 8 | |
|    sub_video_tier | 2 | |
|    sub_video_aspect_ratio | 4 | |
|    sub_video_width_div8 | 16 | |
|    sub_video_height_div8 | 16 | |
|    sub_video_stream_id | 5 | |
|    sub_video_afd_bar () | 32 | |
| } | 5 | |

| Syntax | No. of Bits | Mnemonic |
|---|---|---|
| Sub_video_afd_bar ( ) { | | |
|    sub_video_afd_start_x_div4 | 16 | |
|    sub_video_afd_start_y_div4 | 16 | |
|    sub_video_afd_width_div4 | 16 | |
|    sub_video_ afd_height_div4 | 16 | |
| } | | |

FIG. 22

| Syntax | No. of Bits | Mnemonic |
|---|---|---|
| panorama_filtering_metadata ( ) { | | |
|     panorama_filtering_num | 8 | bslbf |
|     for ( i=0; i<panorama_filtering_num ; i++) { | | |
|         panorama_filtering_cordinate_x_div4 | 16 | uimsbf |
|         panorama_filtering_cordinate_y_div4 | 16 | uimsbf |
|         panorama_filtering_width_div4 | 8 | uimsbf |
|         panorama_filtering_height_div4 | 8 | uimsbf |
|         smoothing_filter_coeff ( ) | | |
|     } | | |
| } | | |

FIG. 23

| Syntax | No. of Bits | Mnemonic |
|---|---|---|
| extraction_info_metadata ( ) { | | |
|   sub_video_width_div8 | 16 | |
|   sub_video_height_div8 | 16 | |
|   sub_video_aspect_ratio | 4 | |
|   sub_video_view_id | 5 | |
|   sub_video_priority | 32 | |
|   reserved | 7 | |
|   sub_video_cropping_start_x_div8 | 16 | |
|   sub_video_cropping_start_y_div8 | 16 | |
|   sub_video_afd_bar ( ) | | |
| } | | |

| Syntax | No. of Bits | Mnemonic |
|---|---|---|
| ROI_info_metadata ( ) { | | |
|    ROI_video_profile | 8 | |
|    ROI_video_level | 8 | |
|    ROI_video_tier | 2 | |
|    ROI_video_priority | 5 | |
|    ROI_video_dynamic_range | 3 | |
|    ROI_video_color_gamut | 3 | |
|    ROI_video_width_div8 | 16 | |
|    ROI_video_height_div8 | 16 | |
|    ROI_start_x_div8 | 16 | |
|    ROI_start_y_div8 | 16 | |
|    ROI_filtering_info_descriptor ( ) | | |
| } | | |

FIG. 26

| Syntax | No. of bits | Identifier |
|---|---|---|
| service_description_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for (i=0; i<N; i++) { | | |
|         service_id | 16 | uimsbf |
|         reserved_future_use | 6 | bslbf |
|         EIT_schedule_flag | 1 | bslbf |
|         EIT_present_following_flag | 1 | bslbf |
|         running-status | 3 | uimsbf |
|         free_CA_mode | 1 | bslbf |
|         descriptors_loop_length | 12 | uimsbf |
|         for (j=0; j<N; j++) { | | |
|             descriptor ( ) | | |
|         } | | |
|     } | | |
|     CRC_32 | 32 | rpchof |
| } | | |

FIG. 27

| Syntax | No. of bits | Identifier |
|---|---|---|
| event_information_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for (i=0; i<N; i++) { | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descriptors_loop_length | 12 | uimsbf |
|         for (i=0; i<N; i++) { | | |
|             descriptor ( ) | | |
|         } | | |
|     } | | |
|     CRC_32 | 32 | rpchof |
| } | | |

FIG. 28

| Syntax | No. of bits | Mnemonic |
|---|---|---|
| event_information_section ( ) { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for (i=0; i< N; i++) { | | |
|     event_id | | |
|     start_time | | |
|     duration | | |
|     running_status | | |
|     free_CA_mode | | |
|     descriptors_loop_length | | |
|     for (i=0; i< N; i++) { | | |
|       descriptor( ) | | |
|     } | | |
|   } | | |
|   CRC_32 | | |
| } | | | linkage_type value of 0x0F is used when a conventional event/service indicates a panorama event/service.
(Conversely, 0x0F can be used to indicate a UHD service when a panorama event/service indicates corresponding HD/3D.)
Otherwise, higher priority may be secured and lower priority may not be considered.

| Syntax | No. of bits | Identifier |
|---|---|---|
| linkage_descriptor ( ) { | | |
|   descriptor_tag | 8 | uimsbf |
|   descriptor_length | 8 | uimsbf |
|   transport_stream_id | 16 | uimsbf |
|   original_network_id | 16 | uimsbf |
|   service_id | 16 | uimsbf |
|   linkage_type | 8 | uimsbf |
|   if (linkage_type == 0x08 ) { | | |
|     mobile_hand-over_info ( ) | | |
|   } else if (linkage_type == 0x0D) { | | |
|     event_linkage_info ( ) | | |
|   } else if (linkage_type == 0x0E) { | | |
|     extended_event_linkage_info ( ) | | |
|   } else if (linkage_type == 0x0F ) { | | |
|     advanced_event_linkage_info ( ) | | |
|   } | | |

FIG. 29

Table 64: Link type coding

| link_type | linkage_type (see note) | type of target service |
|---|---|---|
| 0 | 0x0E | SD |
| 1 | 0x0E | HD |
| 2 | 0x0E | frame compatible plano-stereoscopic |
| 3 | 0x0E | service compatible plano-stereoscopic MVC |
| NOTE: See Table 58. | | |

FIG. 30

| Syntax | No. of Bits | Mnemonic |
|---|---|---|
| advanced_event_linkage_info ( ) { | | |
|   num_link_event | 8 | uimsbf |
|   for ( i=0; i<N; i++) { | | |
|     link_simulcast | 1 | bslbf |
|     link_delivery_type | 3 | uimsbf |
|     detail_info_flag | 1 | bslbf |
|     reserved | 4 | |
|     link_type | 8 | uimsbf |
|     link_event_id | 16 | uimsbf |
|     link_original_network_id | 16 | uimsbf |
|     link_transport_stream_id | 16 | uimsbf |
|     link_service_id | 16 | uimsbf |
|     if ( detail_info_flag =='1') { | | |
|       delivery_detail_info ( ) | | |
|     } | | |
|     if ( link_simulcast =='0') { | | |
|       time_shift_detail_info ( ) | | |
|     } | | |
|   } | | |
| } | | |

FIG. 31

| Syntax | No. of bits | Mnemonic |
|---|---|---|
| TS_program_map_section( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reseved | 3 | bslbf |
|     PCR_PID | 13 | uimsbf |
|     reseved | 4 | bslbf |
|     program_info_length | 12 | uimsbf |
|     for (i=0; i<N; i++) { | | |
|         descriptor( ) | | |
|     } | | |
|     for (i=0; i<N1; i++) { | | |
|         stream_type | | |
|         reserved | | |
|         elementary_PID | | |
|         reserved | | |
|         ES_info_length | | |
|         for (i=0; i<N2; i++) { | | |
|             descriptor( ) | | |
|         } | | |
|     } | | |
|     CRC_32 | | |
| } | | |

Panorama_composition_info( ) may be divided into program level/video level and respectively signaled

```
panorama_composition_info (payloadSize) {
        panorama_service_type
        panorama_composition_info_ver
        panorama_width_div32
        panorama_height_div32
        panorama_profile
        panorama_level
        panorama_tier
        reserved if(panorama_service_type == 1 ){
                panorama_stream_num
                panorama_view_num
                for(i=0; i<panorama_view_num; i++){
                        panorama_view_priority
                        included_stream_id
                }
                for(i=0; i<panorama_stream_num; i++){
                        panorama_composition_metadata( )
                        panorama_filtering_metadata( )
                }
        }
        if(panorama_service_type == 2 ){
                reserved
                cropping_region_num
                for(i=0; i<cropping_region_num; i++){
                        extraction_info_metadata( )
                }
        }
        if(panorama_service_type == 4){
                ROI_num
                ROI_codec_type
                for(i=0; i<ROI_num; i++)
                        ROI_info_metadata( )
                }
        }
}
```

Different elementary_PID values are allocated to streams in the stream division scenario

FIG. 32

| Syntax | No. of bits | Format |
|---|---|---|
| terrestrial_virtual_channel_table_section( ) { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=o; i< num_channels_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequecy | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     sevice_type | 6 | uimsbf |
|     source_id | 16 | uimsbf |
|     reserved | 6 | '111111' |
|     descriptors_length | 10 | uimsbf |
|     for(i=0; i<N; i++) { | | |
|       descriptor( ) | | |
|     } | | |
|   } | | |
| } | | |

FIG. 33

| Syntax | No. of bits | Format |
|---|---|---|
| cable_virtual_channel_table_section ( ) { | | |
|     table_id | 8 | 0xC9 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for (i=o; i< num_channels_in_section; i++) { | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         path_select | 1 | bslbf |
|         out_of_band | 1 | bslbf |
|         hide_guide | 1 | bslbf |
|         reserved | 3 | '111' |
|         sevice_type | 6 | uimsbf |
|         source_id | 16 | uimsbf |
|         reserved | 6 | '111111' |
|         descriptors_length | 10 | uimsbf |
|         for(i=0; i<N; i++) { | | |
|             descriptor( ) | | |
|         } | | |
|     } | | |
| } | | |

FIG. 34

| service_type | Contents | Descriptor |
|---|---|---|
| 0x07 | Parameterized service | component list descriptor<br>panorama_composition_info ( ) |
| 0x09 | Extended parameterized service | component list descriptor<br>parameterized service descriptor<br>panorama_composition_info ( ) |
| 0x10 | New DTV service : new assignment | panorama_composition_info ( ) |

FIG. 35

| Syntax | No. of Bits | Mnemonic |
|---|---|---|
| component_list_descriptor ( ) { | | |
|    descriptor_tag | 8 | uimsbf |
|    descriptor_length | 8 | uimsbf |
|    alternate | 1 | bslbf |
|    component_count | 7 | bslbf |
|    for ( i=0; i< component_count; i++) { | | |
| | 8 | uimsbf |
|      stream_type | 32 | uimsbf |
|      format_identifier | 8 | uimsbf |
|      length_of_details | var | |
|      stream_info_details ( ) | | |
|    } | | |
| } | | |

FIG. 36

| Syntax | No. of Bits | Mnemonic |
|---|---|---|
| stream_info_details ( ) { <br>     reserved <br>     panorama_base_view_profile <br>     panorama_base_view_tier <br>     panorama_base_view_level <br> } | <br> 3 <br> 3 <br> 2 <br> 8 | <br> bslbf <br> bslbf <br> bslbf <br> bslbf |

FIG. 37

| Syntax | No. of Bits | Mnemonic |
|---|---|---|
| stream_info_details ( ) { <br>     reserved <br>     panorama_view_profile <br>     panorama_view_tier <br>     panorama_view_level <br> } | <br> 3 <br> 3 <br> 2 <br> 8 | <br> bslbf <br> bslbf <br> bslbf <br> bslbf |

METHOD AND APPARATUS FOR TRANSRECEIVING BROADCAST SIGNAL FOR PANORAMA SERVICE

This application is a National Stage Application of International Application No. PCT/KR2015/001606 filed Feb. 17, 2015, which claims priority from U.S. Provisional Application No. 61/940,838 filed on Feb. 18, 2014, each of which are hereby incorporated by reference in their entirety.

TECHNICAL FIELD

The present invention relates to transmission and reception of a broadcast signal. More specifically, the present invention relates to a method and/or an apparatus for transmitting/receiving a broadcast signal for a panorama service.

BACKGROUND ART

With the development of digital technology and communication technology, demand for audio and video multimedia content has rapidly expanded in various fields such as broadcasting, movies, Internet and personal media. Furthermore, as 3DTV/3D movies that provide 3D broadcast and movies are popularized, consumer demand for immersive media providing reality and presence increases. In addition, demand for realistic content with high quality above HD increases as home TV screens are enlarged and display technology is developed. Accordingly, realistic broadcasting such as ultra high definition TV (UHDTV) in addition to 3DTV receives attention as a future broadcast service for the post-HDTV market. Particularly, ultra high definition (UHD) broadcast services are under active discussion.

Since the advent of 3D and UHD content, demand for panoramic images is increasing through exhibition halls, newsrooms and outdoor structures. A high-quality panorama service provides a wider viewing angle than the HD video service in addition to presence of 3D content and realism of UHD content to provide maximized presence to users. In spite of such trend, however, standards for acquisition, generation and reproduction of panoramic images do not exist and only a few domestic and foreign research institutes perform technology development.

To view a panoramic image using a DTV receiver, the panoramic image is resized to a small image. Accordingly, to show a panoramic image in the original state, there is a need for research on technology for displaying a panoramic image having an arbitrary size without distorting the panoramic image using existing DTV.

DISCLOSURE

Technical Problem

An object of the present invention devised to solve the problem lies in provision of a panoramic image in the original state at production time to a viewer.

Another object of the present invention is to provide a method of dividing a panoramic image into one or more images and transmitting the images.

Yet another object of the present invention is to provide a method of separating a panoramic image in a display and displaying the separated images.

Still another object of the present invention is to provide an efficient signaling method for providing a panorama service.

Technical Solution

A method of transmitting a broadcast signal according to an embodiment of the present invention includes: encoding an image; multiplexing the encoded image and signaling information about the image into a single broadcast stream, wherein the signaling information includes signaling information about a panoramic image; generating a broadcast signal including the multiplexed broadcast stream; and transmitting the generated broadcast signal.

The signaling information about the image may include event connection information indicating information about a panorama broadcast service corresponding to a currently viewed broadcast service, and the signaling information about the panoramic image may include panorama composition information indicating a composition of the panoramic image.

The encoding may include dividing the image into one or more images and respectively encoding the divided images.

The encoding may include encoding additional information on a region of interest (ROI) of a user in the image, for providing a high-definition image of the ROI, and the multiplexing may include multiplexing the encoded image, the signaling information about the image and the encoded ROI additional information into a single broadcast stream.

The panorama composition information may include information about the divided images.

The panorama composition information may include filtering information for removing blocking artifacts from the divided images.

The panorama composition information may include information for cropping the panoramic image into one or more images.

The panorama composition information may include information about the image of the ROI.

A method of receiving a broadcast signal according to another embodiment of the present invention includes: receiving a broadcast stream including a stream with respect to an image and signaling information about the image, wherein the signaling information includes signaling information about a panoramic image; extracting the stream with respect to the image and the signaling information about the image from the received broadcast stream; and decoding the extracted stream with respect to the image using the extracted signaling information.

The signaling information about the image may include event connection information indicating information about a panorama broadcast service corresponding to a currently viewed broadcast service, and the signaling information about the panoramic image may include panorama composition information indicating a composition of the panoramic image.

The image may be divided into one or more images and the stream with respect to the image may include streams with respect to the one or more divided images, wherein the decoding comprises respectively decoding the streams with respect to the divided images using the extracted signaling information.

The broadcast stream may include a stream with respect to additional information on an ROI of a user in the image, for providing a high-definition image of the ROI, wherein the extracting includes extracting the stream with respect to the image, the stream with respect to the ROI additional information and the signaling information about the image from the received broadcast stream, and the decoding includes decoding the extracted stream with respect to the image and the extracted stream with respect to the ROI additional information using the extracted signaling information.

The panorama composition information may include information about the divided images.

The panorama composition information may include filtering information for removing blocking artifacts from the divided images.

The panorama composition information may include information for cropping the panoramic image into one or more images.

The panorama composition information may include information about the image of the ROI.

The method may further include displaying the decoded stream with respect to the image, wherein the displaying comprises displaying a region shifted according to a scrolling request when the scrolling request is received from a user.

An apparatus for transmitting a broadcast signal according to another embodiment of the present invention includes: an encoder for encoding an image; a multiplexer for multiplexing the encoded image and signaling information about the image into a single broadcast stream, wherein the signaling information includes signaling information about a panoramic image; a broadcast signal generator for generating a broadcast signal including the multiplexed broadcast stream; and a transmitter for transmitting the generated broadcast signal.

An apparatus for receiving a broadcast signal according to another embodiment of the present invention includes: a receiver for receiving a broadcast stream including a stream with respect to an image and signaling information about the image, wherein the signaling information includes signaling information about a panoramic image; a demultiplexer for extracting the stream with respect to the image and the signaling information about the image from the received broadcast stream; and a decoder for decoding the extracted stream with respect to the image using the extracted signaling information.

Advantageous Effects

According to the present invention, a panoramic image in the original state at production time may be provided to a viewer.

According to the present invention, a method of dividing a panoramic image into one or more images and transmitting the images may be provided.

According to the present invention, a method of separating a panoramic image in a display and displaying the separated images may be provided.

According to the present invention, an efficient signaling method for providing a panorama service may be provided.

DESCRIPTION OF DRAWINGS

FIG. 1 is a diagram illustrating a broadcast signal transmission method according to an embodiment of the present invention.

FIG. 2 is a diagram illustrating the composition of scenario 1 according to an embodiment of the present invention.

FIG. 3 is a diagram illustrating the composition of scenario 2 according to an embodiment of the present invention.

FIG. 6 is a diagram illustrating a method of dividing a panoramic image according to an embodiment of the present invention.

FIG. 7 is a diagram illustrating a panorama service composition of scenario 1 according to an embodiment of the present invention.

FIG. 17 is a diagram illustrating the composition of panorama_composition_info according to an embodiment of the present invention.

FIG. 18 is a diagram illustrating a composition of panorama_service_type according to an embodiment of the present invention.

FIG. 19 is a diagram illustrating a composition of panorama_composition_metadata( ) according to an embodiment of the present invention.

FIG. 22 is a diagram illustrating a composition of panorama_filtering_metadata( ) according to an embodiment of the present invention.

FIG. 23 is a diagram illustrating the composition of extraction_info_metadata( ) according to an embodiment of the present invention.

FIG. 26 is a diagram illustrating a composition of a service description table (SDT) according to an embodiment of the present invention.

FIG. 27 is a diagram illustrating a composition of an event information table (EIT) according to an embodiment of the present invention.

FIG. 28 is a diagram illustrating a composition of linkage_descriptor( ) included in the EIT according to an embodiment of the present invention.

FIG. 29 is a diagram illustrating type of a target service according to link_type when linkage_type is 0x0E according to an embodiment of the present invention.

FIG. 30 is a diagram illustrating a composition of advanced_event_linkage_info( ) according to an embodiment of the present invention.

FIG. 31 is a diagram illustrating a composition of a program map table (PMT) and the position of panorama_composition_info( ) included in the PMT according to an embodiment of the present invention.

FIG. 32 is a diagram illustrating a composition of a terrestrial virtual channel table (TVCT) according to an embodiment of the present invention.

FIG. 33 is a diagram illustrating a composition of a cable virtual channel table (CVCT) according to an embodiment of the present invention.

FIG. 34 is a diagram illustrating a composition of service_type for a panorama service according to an embodiment of the present invention.

FIG. 35 is a diagram illustrating a composition of component_list_descriptor( ) according to an embodiment of the present invention.

FIG. 36 is a diagram illustrating a composition of stream_info_details( ) when stream_type indicates a base stream according to an embodiment of the present invention.

FIG. 37 is a diagram illustrating a composition of stream_info_details( ) when stream_type indicates a stream other than the base stream according to an embodiment of the present invention.

BEST MODE

Figure 4:
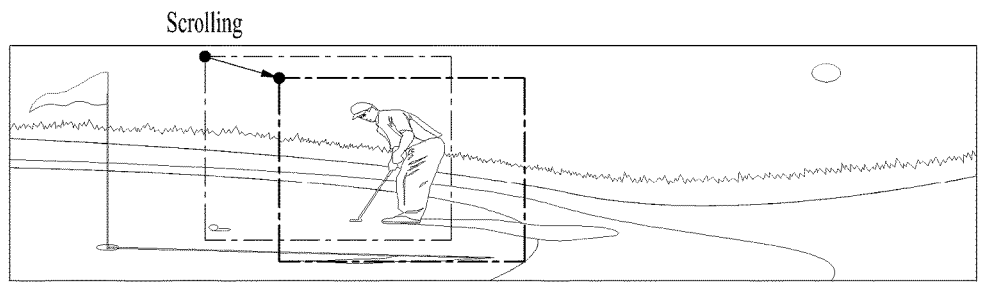
FIG. 4 is a diagram illustrating the composition of scenario 3 according to an embodiment of the present invention.

Reference will now be made in detail to the preferred embodiments of the present invention, examples of which are illustrated in the accompanying drawings. However, the invention should not be limited to the specific embodiments described herein.

Although the terms used in the present invention are selected from generally known and used terms, some of the terms mentioned in the description of the present invention are selected by the applicant at his or her discretion, the detailed meanings of which are described in relevant parts of the description herein. Furthermore, it is required that the present invention is understood, not simply by the actual terms but by the meanings of each term lying within.

FIG. 1 is a diagram illustrating a broadcast signal transmission method according to an embodiment of the present invention.

The broadcast signal transmission method according to an embodiment of the present invention may perform the following process.

An encoder according to an embodiment of the present invention may encode an image (S1010). A multiplexer according to an embodiment of the present invention may multiplex the encoded image and/or signaling information related to the image into one broadcast stream (S1020). Here, the signaling information may include signaling information about a panoramic image. A broadcast signal generator according to an embodiment of the present invention may generate a broadcast signal including the multiplexed broadcast stream (S1030). A transmitter according to an embodiment of the present invention may transmit the generated broadcast signal (S1040). Here, the transmitter may transmit the broadcast signal through a terrestrial broadcast network, the Internet and/or a cable network.

According to another embodiment of the present invention, the signaling information related to the image may include event connection information that indicates information about a panorama broadcast service corresponding to a currently viewed broadcast service, and the signaling information about the panoramic image may include panorama composition information that indicates the composition of the panoramic image. Here, the event connection information may refer to advanced_event_linkage_info. The panorama composition information may refer to panorama_composition_info. A detailed description thereof will be given later with reference to FIGS. 17 and 30.

According to another embodiment of the present invention, the encoder may divide the image into one or more images and respectively encode the divided images. Here, the image may include a panoramic image. A detailed description thereof will be given later with reference to FIGS. 2, 6 and 7.

According to another embodiment of the present invention, the encoder may encode additional information about an ROI (Region of Interest) for providing a high-quality image for an ROI of a user in the image, and the multiplexer may multiplex the encoded image, the signaling information related to the image and/or the encoded additional information about the ROI into one broadcast stream. Here, the additional information about the ROI may refer to ROI enhancement data. A detailed description thereof will be given later with reference to FIGS. 5, 16 and 41.

According to another embodiment of the present invention, the panorama composition information may include information about the divided images. Here, the information about the divided images may refer to panorama_composition_metadata. A detailed description thereof will be given later with reference to FIGS. 17, 19 and 20.

According to another embodiment of the present invention, the panorama composition information may include filtering information for removing blocking artifacts from the divided images. Here, the filtering information for blocking artifact removal may refer to panorama_filtering_metadata. A detailed description thereof will be given later with reference to FIGS. 17, 19 and 22.

According to another embodiment of the present invention, the panorama composition information may include information for cropping the panoramic image into one or more images. Here, the information for cropping the panoramic image may refer to extraction_info_metadata. A detailed description thereof will be given later with reference to FIGS. 3, 8, 17, 23 and 38.

According to another embodiment of the present invention, the panorama composition information may include information about an image of the ROI. Here, the information about the image of the ROI may refer to ROI_info_metadata. A detailed description thereof will be given later with reference to FIGS. 17, 25 and 41.

An embodiment of the present invention may provide an efficient display method for maximizing advantages of a panoramic image. For example, an embodiment of the present invention may provide a method of receiving only an ROI using an existing receiver, a method of efficiently displaying a panoramic image having an arbitrary size using a plurality of existing receivers and a method of allowing a user to view an area other than an area in which a receiver can display an image through scrolling.

An embodiment of the present invention may divide a panoramic image into images having a specific size, respectively encode the images, deliver the encoded images to a plurality of receivers and allow the receivers to output parts of the panoramic image corresponding thereto. In addition, an embodiment of the present invention may allow one existing DTV receiver to display part of a panoramic image by signaling priority of the part of the panoramic image (scenario 1). That is, scenario 1 may generate one stream composed of divided panoramic images.

Another embodiment of the present invention may signal a panoramic image and coordinate values for dividing the panoramic image such that a main receiver delivers cropped images to a plurality of sub-DTV receivers. In addition, an embodiment of the present invention may allow all receivers to decode the entire panoramic image and to output parts of the panoramic image, which respectively correspond to the receivers. Furthermore, an embodiment of the present invention may allow a cropped image to be viewed even through one existing DTV receiver (scenario 2). That is, scenario 2 may compose a panoramic image as one stream.

Another embodiment of the present invention may display a default region and then display an image shifted by a scrolling request from a user upon reception of the scrolling request. When multiple 16:9 DTV receivers divide a panoramic image and output the divided images, scrolling may be performed sequentially and automatically in other DTV receivers (scenario 3). The service according to scenario 3 may be provided on the basis of scenario 1 and/or scenario 2.

Another embodiment of the present invention may provide enhancement data of some ROI through an enhancement layer using scalable HEVC (SHVC) and provide signaling information about the enhancement data in order to provide a high picture quality service with respect to ROI (scenario 4).

When a viewer views a general broadcast event, another embodiment of the present invention may provide a panorama service corresponding to the broadcast event using a linkage descriptor when the panorama service is present (scenario 5).

According to an embodiment of the present invention, even a DTV receiver having an aspect ratio of 16:9 may display a panoramic image without resizing the same. An embodiment of the present invention may allow one display device to output some ROI included in a panoramic image and allow a plurality of DTV receivers to divide a panoramic image and to display the divided images.

According to an embodiment of the present invention, when receivers display a panoramic image using the method of scenario 1 or 2, the panoramic image may be shifted and selectively displayed upon input of a scrolling request from a user.

According to an embodiment of the present invention, a high-quality video service may be provided without transmission of large-sized data, using a method of transmitting enhancement data regarding ROI.

According to an embodiment of the present invention, a panoramic image service and a video service with an aspect ratio of 16:9 may be linked. Here, the video service with 16:9 may provide an image obtained by dividing a panoramic image or may be a conventional 16:9 video service.

FIG. 2 is a diagram illustrating the composition of scenario 1 according to an embodiment of the present invention.

According to scenario 1, a panoramic image having an arbitrary size may be divided into images having a predetermined size, encoded and delivered to a plurality of receivers such that the receivers output relevant parts of the panoramic images. In addition, even a receiver that cannot output a panoramic image without resizing the same may display a desired part of the panoramic image by numbering parts of the panoramic image (or designating the parts as a base view).

According to an embodiment of the present invention, divided and encoded streams may be transmitted to a main receiver, as represented by solid lines in the figure. The main receiver may decode the transmitted streams and then deliver the decoded streams to sub-receivers.

According to another embodiment of the present invention, streams encoded for divided images may be transmitted to the sub-receivers and the main receiver, as represented by dotted lines in the figure. The sub-receivers and the main receiver may decode the transmitted streams with respect to the divided images and then display the images.

FIG. 3 is a diagram illustrating the composition of scenario 2.

Scenario 2 according to an embodiment of the present invention may signal a panoramic image and coordinate values for cropping the panoramic image. Accordingly, scenario 2 may allow a plurality of DTV receivers to divide the panoramic image and to output the divided images Scenario 2 may crop a panoramic image and provide the cropped panoramic image to a user using a conventional DTV receiver. In addition, scenario 2 may allow a second device to display a cropped part.

According to an embodiment of the present invention, one stream encoded with respect to a panoramic image may be transmitted to a main receiver, as represented by a solid line 3010 in the figure. The main receiver may decode the transmitted stream and extract part of the panoramic image using cropping coordinates. In addition, the main receiver may deliver the extracted part of the panoramic image to sub-receivers.

According to another embodiment of the present invention, the stream encoded with respect to the panoramic image may be transmitted to all sub-receivers and the main receiver, as represented by dotted lines 3020 in the figure. Each receiver may decode the transmitted stream, crop the image corresponding to the stream using cropping coordinates and display an image required therefor.

According to another embodiment of the present invention, the stream encoded with respect to the panoramic image may be transmitted to an existing receiver and/or a second device, as represented by other dotted lines 3030 in the figure. The existing receiver and/or the second device may decode the transmitted stream, crop the image corresponding to the stream and display the cropped image.

FIG. 4 is a diagram illustrating the composition of scenario 3 according to an embodiment of the present invention.

Scenario 3 according to an embodiment of the present invention may allow a receiver to output part of a panoramic image as a default region and, when a scrolling request is received from a user, to shift coordinate values by corresponding scrolling information and to display the region.

A scrolling method according to an embodiment of the present invention may depend on the number of receivers that display a panoramic image or the number of encoded streams.

Figure 5:
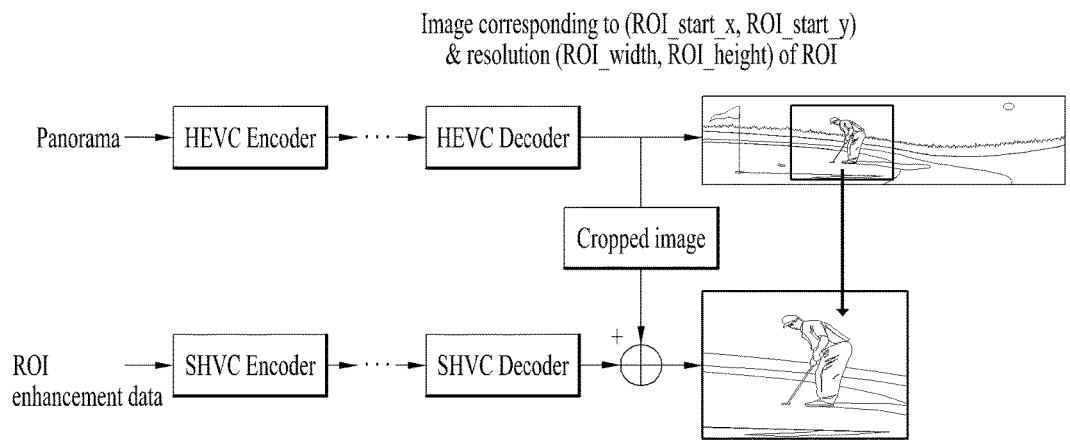
FIG. 5 is a diagram illustrating the composition of scenario 4 according to an embodiment of the present invention.

FIG. 5 is a diagram illustrating the composition of scenario 4 according to an embodiment of the present invention.

Scenario 4 according to an embodiment of the present invention may provide high picture quality zoom-in and zoom-out functions for ROI. To this end, scenario 4 may provide enhancement data about part of a panoramic image using an enhancement layer of SHVC and provide signaling information about the enhancement data.

Referring to the figure, a panoramic image may be encoded (by an HEVC encoder) into a stream of a base layer or an enhancement layer and transmitted. A receiver may decode the encoded stream (by an HEVC decoder) and display an image corresponding to the stream Enhancement data regarding ROI may be encoded (by an SHVC encoder) into a stream of an enhancement layer and transmitted. The receiver may decode the encoded stream (by an SHVC decoder) and display an image corresponding to the stream. Here, the receiver may crop the ROI of the received panoramic image using information about the ROI (ROI_start_x, ROI_start_y, ROI_width and/or ROI_height) and provide a high-quality image with respect to the ROI using the received enhancement data. Here, SHVC is short for scalable HEVC and may correspond to scalable codec based on HEVC. Accordingly, SHVC includes HEVC and encodes and/or decodes an enhancement layer stream to provide scalability. The enhancement layer may correspond to a layer including a stream having residual data except information included in HEVC streams of the base layer.

When a viewer views a general broadcast event, scenario 5 according to another embodiment of the present invention may provide a panorama service corresponding to the event using the linkage descriptor when the panorama service is present. Here, the event may refer to a broadcast program.

FIG. 6 is a diagram illustrating a method of dividing a panoramic image according to an embodiment of the present invention.

According to an embodiment of the present invention, the panoramic image may be divided into left, center and right regions. As shown in the figure, the panoramic image may be divided into a plurality of images in a mosaic form.

According to an embodiment of the present invention, the divided images may be signaled as one-dimensional values (6010) or signaled as two-dimensional coordinate values, as shown in the figure. Here, number allocation order may vary.

FIG. 7 is a diagram illustrating a panorama service composition of scenario 1 according to an embodiment of the present invention.

An embodiment of the present invention may divide a panoramic image having an arbitrary size into predetermined areas based on a service (service 1) compatible with the 16:9 format. The divided images may be encoded and transmitted to a plurality of receivers. The receivers may display images corresponding thereto.

To display the entire panoramic image through the receivers, an embodiment of the present invention may provide service 1, service 2, service 3 and/or the panorama service to the receivers using an image 7010 corresponding to service 1, an image 7020 corresponding to service 2, an image 7030 corresponding to service 3 and/or panorama composition information.

According to an embodiment of the present invention, a video wall and/or signage, which can display panoramic images, may compose the same panoramic image as the original panoramic image and display the same. Here, the video wall may refer to a large screen composed by stacking video screens. The signage may refer to a large display such as a display advertisement board.

According to another embodiment of the present invention, a receiver may display the panoramic image through a DTV receiver with an aspect ratio of 16:9 without resizing the panoramic image. In this case, only an image selected by the user from the divided images 7010, 7020 and 7030 may be displayed. In addition, an embodiment of the present invention may provide service 1 designated a default service.

Figure 8:
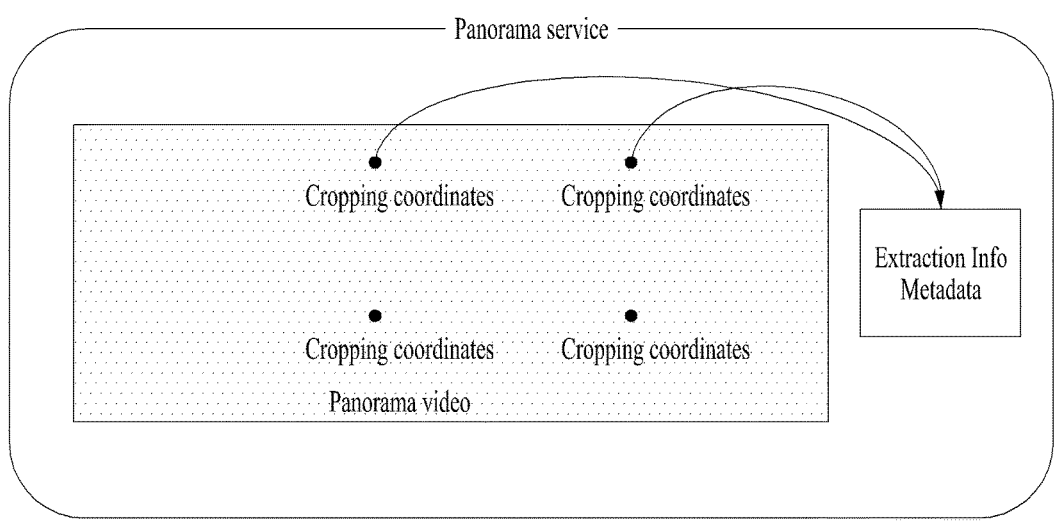
FIG. 8 is a diagram illustrating a panorama service composition of scenario 2 according to an embodiment of the present invention.

FIG. 8 is a diagram illustrating a panorama service composition of scenario 2 according to an embodiment of the present invention.

An embodiment of the present invention may transmit cropping coordinate values for dividing a panoramic image having an arbitrary size to one or more receivers along with the panoramic image. The receivers may receive the entire panoramic image, decode the panoramic image and then crop the panoramic image using the cropping coordinate values.

According to an embodiment of the present invention, when a 16:9 receiver displays the panoramic image without resizing the same, the receiver may select a desired image of the user using extraction info metadata including the cropping coordinate values and display the selected image. Here, the receiver may provide the 16:9 service using a cropping coordinate value designated as a default value from among the cropping coordinate values included in the extraction info metadata. Here, the receiver may be a DTV receiver.

According to another embodiment of the present invention, when a plurality of receivers displays the entire panoramic image, the receivers may divide the panoramic image using the extraction info metadata and display images respectively corresponding to the receivers. Here, the receivers may refer to DTV receivers.

According to another embodiment of the present invention, a video wall and/or signage, which can display panoramic images, may display the panoramic image without regard to the extraction info metadata.

Figure 9:
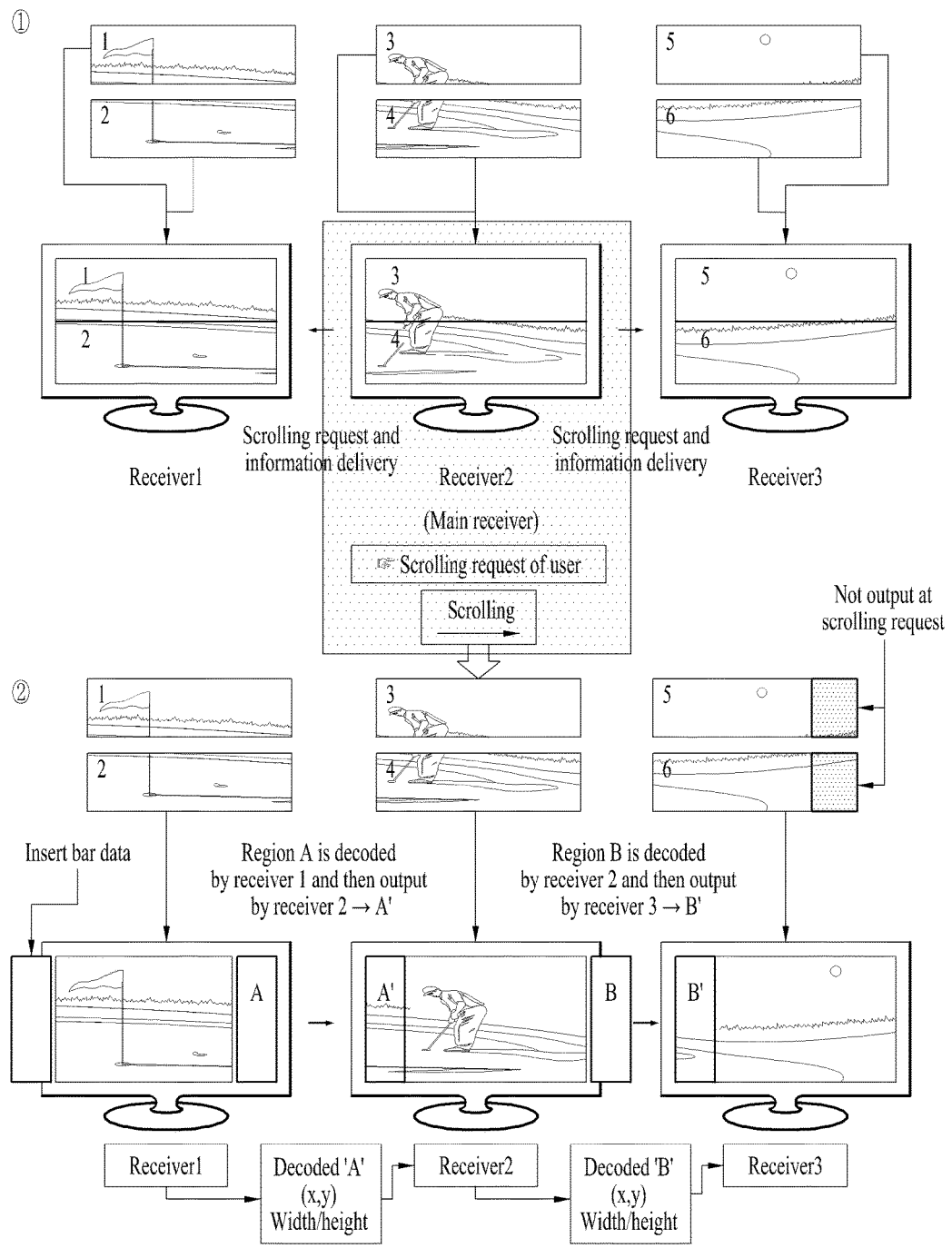
FIG. 9 is a diagram illustrating operations of a plurality of receivers according to scrolling when the receivers decode streams generated by encoding divided panoramic images based on scenario 1 according to an embodiment of the present invention.

FIG. 9 is a diagram illustrating operations of a plurality of receivers according to scrolling when the receivers decode a stream generated by encoding divided panoramic images based on scenario 1 according to an embodiment of the present invention.

According to an embodiment of the present invention, when a scrolling request for scrolling a panoramic image composed through scenario 1 or 2 by +X on the x-axis and by +Y on the y-axis is received, the receivers may display an image shifted from the panoramic image by X to the right and by Y to the top. Here, scenario 3(receiver operation according to scrolling) according to an embodiment of the present invention may provide the service through different methods in a case based on scenario 1 that composes the divided panoramic images as one stream and in a case based on scenario 2 that composes the entire panoramic image as one stream.

Scenario 3 according to an embodiment of the present invention may provide the service through different methods in a case in which a plurality of receivers decodes the stream generated by encoding the divided panoramic images and in a case in which one receiver decodes the stream generated by encoding the divided panoramic images even when scenario 3 is based on scenario 1.

The figure illustrates operations of a plurality of receivers according to scenario 3 when the receivers decode the stream generated by encoding the divided panoramic images based on scenario 1.

When the entire panoramic image is divided into multiple images and the divided images are transmitted through respective streams according to an embodiment of the present invention (scenario 1 ), the receivers may decode streams that need to be output by the respective receivers and display images corresponding to the streams. Here, when a receiver receives a scrolling request from the user, the receiver may separate a part to be scrolled according to the scrolling request, from the image decoded thereby, and deliver the part to another receiver or receive a necessary image part from another receiver. In this case, the image part scrolled according to the scrolling request, that is, the necessary image part, may be delivered using a method such as Internet protocol (IP), universal plug and play (UPnP) and high definition multimedia interface (HDMI).

According to an embodiment of the present invention, the panoramic image may be divided into 6 images, as illustrated in the figure. Here, the left top image to the right bottom image may be sequentially numbered from 1 to 6 for convenience of description. The divided images may be transmitted to a plurality of receivers. For example, images 1 and 2 may be encoded into streams and delivered to receiver 1. Similarly, images 3 and 4 may be delivered to receiver 2 and images 5 and 6 may be delivered to receiver 3. Here, when a scrolling request is received from the user, a receiver that has received the scrolling request may become a main receiver. The main receiver may deliver the scrolling request and signaling information thereabout to other sub-receivers. For example, when a scrolling request for scrolling from the left to the right is received from the user, receiver 1 may insert bar data to a left region of the receiver thereof, which is generated according to scrolling of the image displayed through receiver 1. Referring to the figure, a scrolled part (region A) of the image corresponding to receiver 1 is moved to a left region (region A') of receiver 2 and output by receiver 2 after being decoded although region A is decoded in receiver 1. Receiver 2 receives the decoded image corresponding to region A from receiver 1 and display the image. A right region (region B) of the image displayed through receiver 2 is scrolled according to the scrolling request to a left region (region B') of the display of receiver 3 and output by receiver 3 after being decoded in receiver 2. Receiver 3 may receive the decoded image corresponding to region B from receiver 2 and display the image. A right region of the image displayed through display 3 is scrolled according to the scrolling request and thus may not be displayed. According to an embodiment of the present invention, receiver 1 may deliver the decoded image corresponding to region A and/or coordinate information (width and/or height) about region A to receivers. Similarly, receiver 2 may deliver the decoded image corresponding to region B and coordinate information about region B to receiver 3, as shown in the figure.

Figure 10:
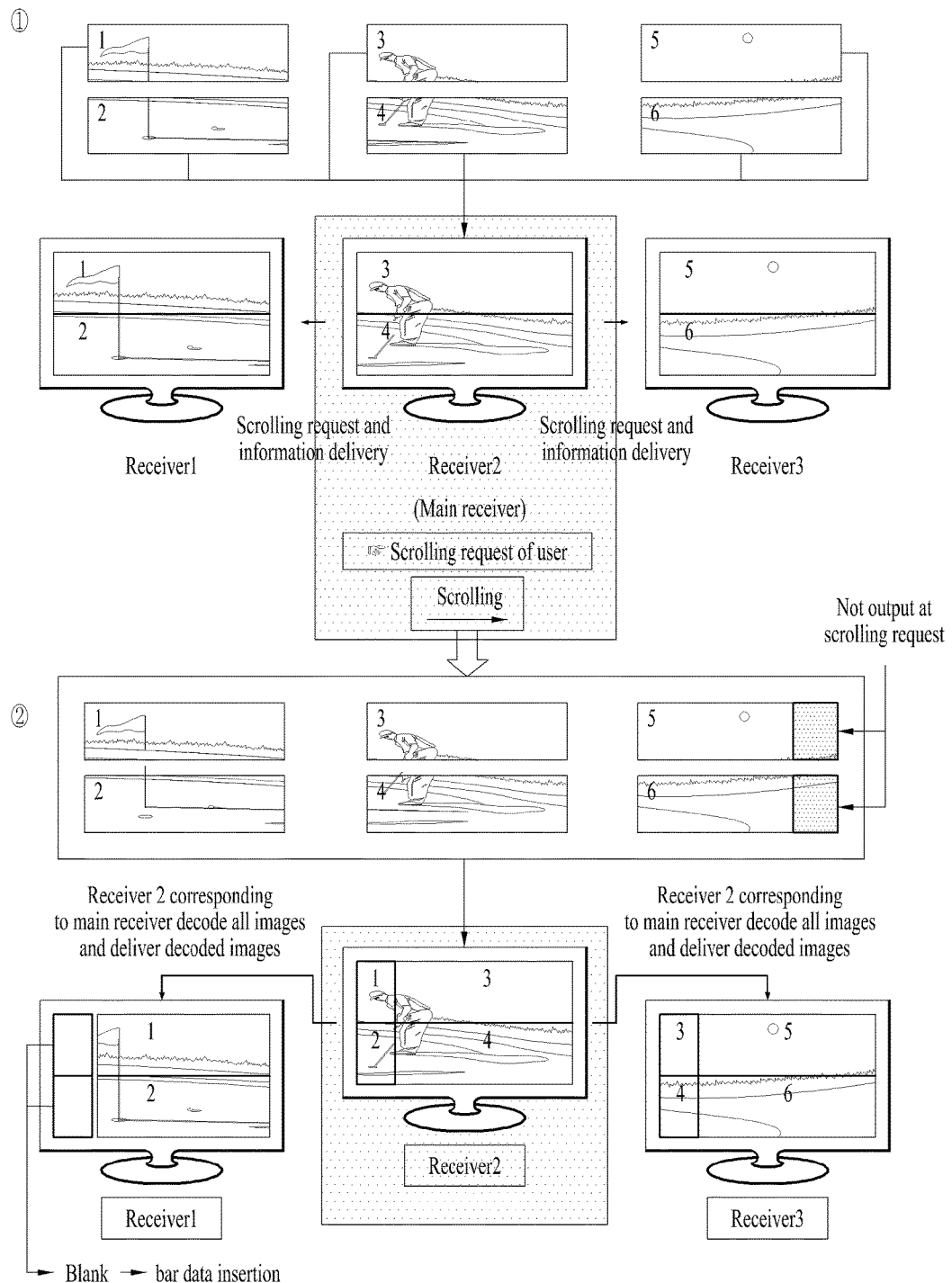
FIG. 10 is a diagram illustrating an operation of a receiver according to scrolling when the receiver decodes streams generated by encoding divided panoramic images based on scenario 1 according to an embodiment of the present invention.

FIG. 10 is a diagram illustrating an operation of a receiver according to scrolling when the receiver decodes streams generated by encoding divided panoramic images based on scenario 1 according to an embodiment of the present invention.

This figure illustrates receiver operation according to scenario 3 (scrolling) when a plurality of receivers decodes streams generated by encoding divided panoramic images based on scenario 1.

When a panoramic image is divided into a plurality of images and the divided images are transmitted in the form of respective streams (scenario 1) according to an embodiment of the present invention, the main receiver may receive and decode all streams and deliver all decoded images to sub-receivers. That is, since the present embodiment describes a method through which the main receiver decodes all images, composes the entire panoramic image and delivers, to the sub-receivers, images to be displayed through the sub-receivers, the method according to the present embodiment may be the same as the method through which the main receiver decodes the entire panoramic image and delivers the same to a plurality of receivers in scenario 2 (cropping).

The sub-receivers may receive images to be output therethrough from the main receiver and display the images. Here, when a scrolling request is received from the user, the main receiver may scroll the decoded panoramic image in response to the scrolling request and deliver, to the sub-receivers, decoded images to be output by the sub-receivers, using a method such as IP, UPnP and HDMI.

According to an embodiment of the present invention, the panoramic image may be divided into 6 images, as illustrated in the figure. Here, the left top image to the right bottom image may be sequentially numbered from 1 to 6 for convenience of description. The divided images may be respectively encoded into streams and delivered to one receiver. For example, the divided images 1 to 6 may be respectively encoded into streams and all the encoded streams may be delivered to receiver 2. When a scrolling request is received from the user, a receiver that has received the scrolling request may become a main receiver. The main receiver may deliver the scrolling request and signaling information thereon to other sub-receivers. For example, if a scrolling request for scrolling from the left to the right is received from the user, images to be displayed through the respective receivers, in the entire panoramic image, may be changed, and thus the main receiver may decode the entire panoramic image, subdivide the images to be displayed through the respective receivers and deliver the same to the sub-receivers. Here, receiver 1 may insert bar data into a left region generated according to scrolling of the image displayed through receiver 1 and a right part of the image displayed through receiver 3, which is scrolled according to the scrolling request, may not be displayed.

Figure 11:
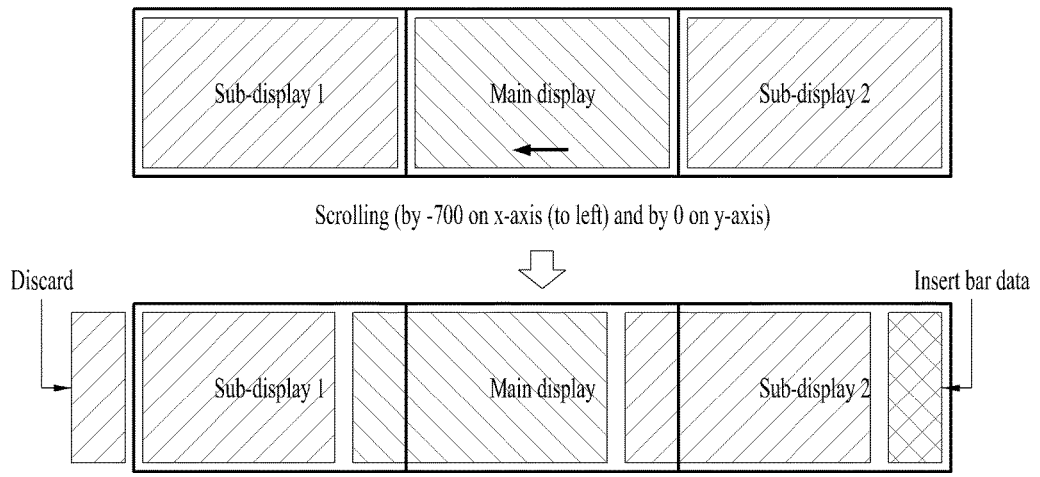
FIG. 11 is a diagram illustrating arrangement of a panoramic image according to scrolling request when a plurality of receivers having the same display size display the panoramic image according to an embodiment of the present invention.

FIG. 11 is a diagram illustrating arrangement of a panoramic image according to a scrolling request when a plurality of receivers having the same display size displays the panoramic image according to an embodiment of the present invention.

A main receiver (main display) according to an embodiment of the present invention may decode a stream transmitted thereto irrespective of the scrolling request. Then, when a scrolling request for scrolling the image by +X on the x-axis and +Y on the y-axis is received, the main receiver may display an image having the same width and height as the display thereof in a display area starting from a point shifted from the point (0, 0) by +X on the x-axis and +Y on the y-axis. For example, the figure illustrates arrangement of the panoramic image when the panoramic image is scrolled by 700 along the x-axis (to the left) and 0 along the y-axis.

According to an embodiment of the present invention, when there are images to be displayed by the main receiver or other sub-receivers although decoded by sub-receivers (sub-display 1 and sub-display 2), the sub-receivers that have decoded the images may deliver the decoded images to the main receiver or other sub-receivers that will display the images. Similarly, when there are images to be displayed by sub-receivers although decoded by the main receiver, the main decoder that has decoded the images may deliver the decoded images to the sub-receivers that will display the images.

The sub-receivers (sub-display 1 and sub-display 2) according to an embodiment of the present invention may receive a scrolling request of the user from the main receiver. The sub-receivers may decode received streams irrespective of the scrolling request. Then, when a scrolling request for scrolling the image by +X on the x-axis and +Y on the y-axis is received, the main receiver may display an image having the same width and height as the display thereof in a display area starting from a point shifted from the point (0, 0) by +X on the x-axis and +Y on the y-axis. When blanks are generated in the display screens of the sub-receivers due to scrolling, the sub-receivers may insert bar data into the blanks based on display resolution and scrolling information thereof. Here, a letterbox and/or a pillar box may be inserted as the bar data or the letter box and the pillar box may be combined and inserted.

When there is an image that has not been decoded by a sub-receiver according to an embodiment of the present invention but needs to be displayed by the sub-receiver, the sub-receiver may receive the decoded image from the main receiver or other sub-receivers.

Figure 12:
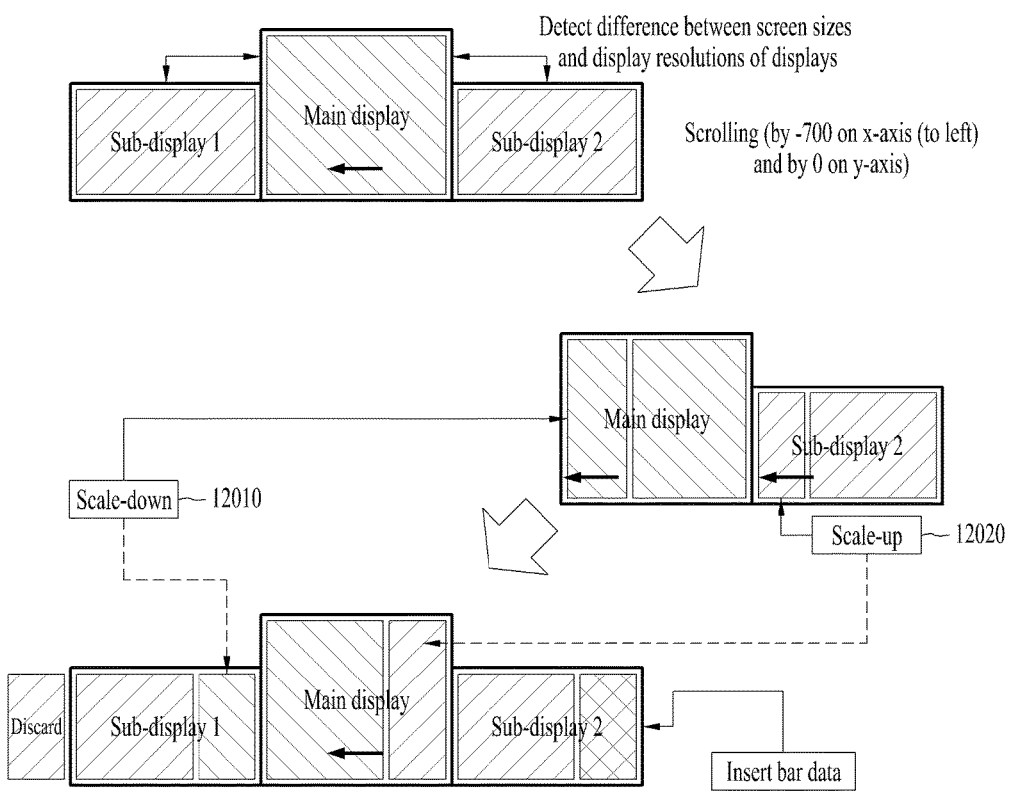
FIG. 12 is a diagram illustrating arrangement of a panoramic image according to scrolling request using scaling when a plurality of receivers having different display sizes display the panoramic image according to an embodiment of the present invention.

FIG. 12 is a diagram illustrating arrangement of a panoramic image according to a scrolling request using scaling when a plurality of receivers having different display sizes displays the panoramic image according to an embodiment of the present invention.

Distinguished from the aforementioned case in which a plurality of receivers having the same display size displays a panoramic image, scaling down and/or scaling up may be performed since the receivers have different display sizes in the present embodiment. According to an embodiment of the present invention, a main receiver and a sub-receiver may exchange information about screen sizes and/or display resolutions and positions at which receivers are connected may be set, like a case in which a multi-monitor is used in order to use a plurality of receivers.

A main receiver and a sub-receiver according to an embodiment of the present invention may exchange information about screen sizes and/or display resolutions thereof. Such information exchange may be performed only when initially executed. According to an embodiment of the present invention, a receiver to which the user has sent a scrolling request becomes the main receiver and the main receiver may deliver scrolling related information to all sub-receivers.

The main receiver (main display) according to an embodiment of the present invention may decode streams transmitted thereto irrespective of the scrolling request. Then, when a scrolling request for scrolling the image by +X on the x-axis and +Y on the y-axis is received, the main receiver may display an image having the same width and height as the display thereof in a display area starting from a point shifted from the point (0, 0) by +X on the x-axis and +Y on the y-axis. For example, the figure illustrates arrangement of the panoramic image when the panoramic image is scrolled by 700 along the x-axis (to the left) and 0 along the y-axis.

When the main receiver according to an embodiment of the present invention has a larger display size than other sub-receivers, images sent from the main receiver to the sub-receivers may be scaled down based on the display resolutions and/or screen sizes of the sub-receivers and delivered to the sub-receivers (12010). Conversely, images sent from the sub-receivers to the main receiver may be scaled up based on the display resolution and/or screen size of the main receiver and delivered to the main receiver (12020).

Sub-receivers (sub-display 1 and sub-display 2) according to an embodiment of the present invention may receive a scrolling request of the user from the main receiver. The sub-receivers may decode received streams irrespective of the scrolling request. Then, when a scrolling request for scrolling the image by +X on the x-axis and +Y on the y-axis is received, the main receiver may display an image having the same width and height as the display thereof in a display area starting from a point shifted from the point (0, 0) by +X on the x-axis and +Y on the y-axis. When blanks are generated in the display screens of the sub-receivers due to scrolling, the sub-receivers may insert bar data into the blanks based on display resolution and scrolling information thereof. Here, a letterbox and/or a pillar box may be inserted as the bar data or the letter box and the pillar box may be combined and inserted.

Figure 13:
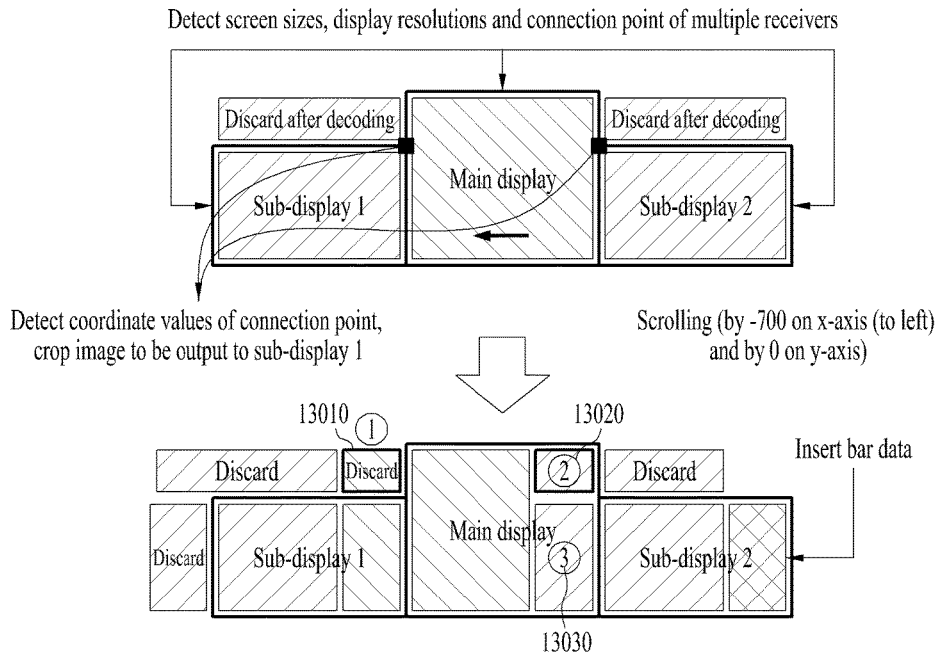
FIG. 13 is a diagram illustrating arrangement of a panoramic image according to scrolling request using cropping when a plurality of receivers having different display sizes display the panoramic image according to an embodiment of the present invention.

FIG. 13 is a diagram illustrating arrangement of a panoramic image according to a scrolling request using cropping when a plurality of receivers having different display sizes displays the panoramic image according to an embodiment of the present invention.

Distinguished from the aforementioned panoramic image arrangement according to a scrolling request using scaling, decoded images may be cropped to be adapted to display sizes without being scaled and assigned to respective receivers in another embodiment of the present invention.

Sub-receivers (sub-display 1 and sub-display 2) according to an embodiment of the present invention may receive segmented streams, decode the received streams and crop the images corresponding to the streams to be suited to the display sizes thereof using display resolutions thereof, coordinates values of positions at which receivers are connected, display sizes of the receivers and/or scrolling information.

Upon reception of a scrolling request from the user, image 1 (13010) displayed through the main receiver may be cropped and discarded using display resolutions of respective receivers, coordinate values at which the receivers are connected, display sizes of the receivers and/or scrolling information. Image 2 (13020) discarded for fitting to the display size of the relevant sub-receiver may be delivered along with image 3 (13030) to the main receiver without being discarded after decoding. For example, the figure illustrates panoramic image arrangement when the panoramic image is scrolled by 700 along the x-axis (to the left) and 0 along the y-axis.

Figure 14:
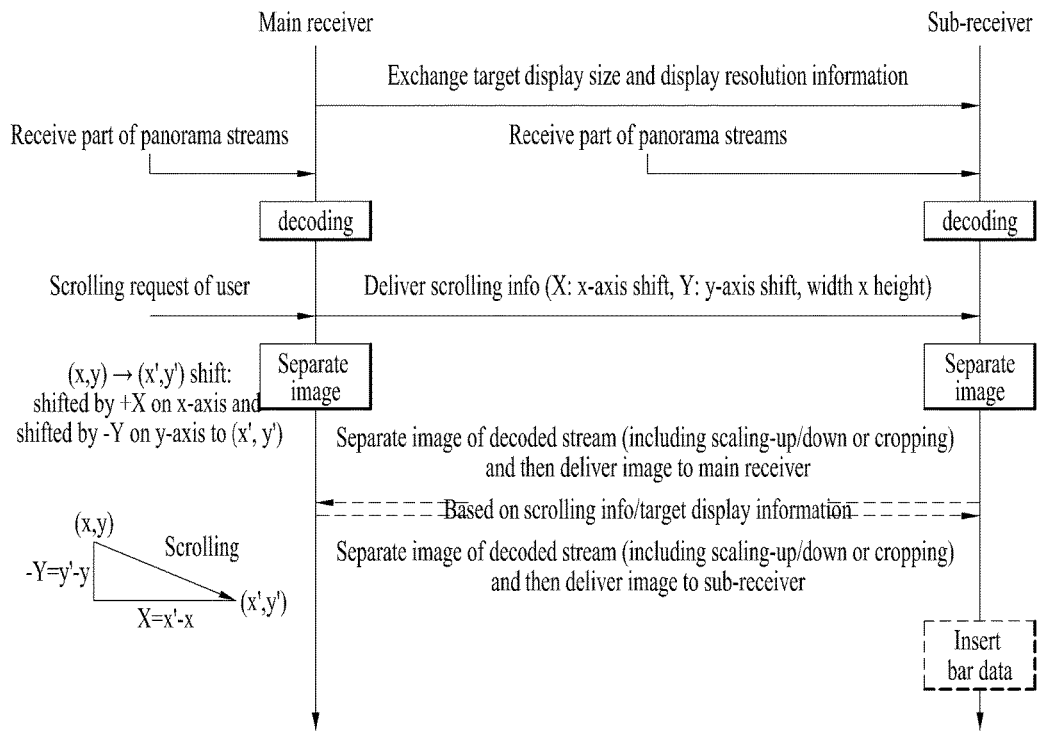
FIG. 14 is a diagram illustrating operations of two receivers when the receivers display a panoramic image according to an embodiment of the present invention.

FIG. 14 is a diagram illustrating operations of two receivers when the receivers display a panoramic image according to an embodiment of the present invention.

According to an embodiment of the present invention, a receiver that has received a scrolling request from the user may be a main receiver and the other receiver may be a sub-receiver.

According to an embodiment of the present invention, the main receiver and the sub-receiver may exchange target display sizes and/or output resolution information. Here, the target display sizes may refer to display sizes of the main receiver and/or the sub-receiver. The main receiver and the sub-receiver may respectively receive streams with respect to divided panoramic images and decode the received streams. When a scrolling request for scrolling by +X along the x-axis and Y along the y-axis ((x,y)>(x',y')) is input, the main receiver may receive the scrolling request and deliver scrolling information to the sub-receiver. The main receiver may separate an image with respect to the stream decoded therein using scrolling information and/or target display information and deliver the same to the sub-receiver. Similarly, the sub-receiver may separate an image with respect to the stream decoded therein using the scrolling information and/or target display information and deliver the same to the main receiver. Here, the target display information may include target display size and/or display resolution information. The method of separating an image with respect to a decoded stream may include the aforementioned scaling and/or cropping methods.

Figure 15:
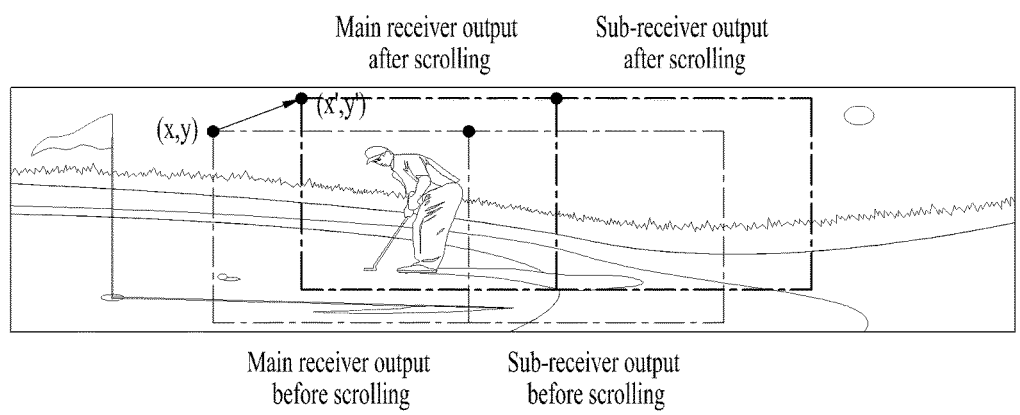
FIG. 15 is a diagram illustrating an operation of a receiver when the receiver receives a panoramic image encoded into one stream based on scenario 2 according to an embodiment of the present invention.

FIG. 15 is a diagram illustrating receiver operation according to scrolling when a receiver receives a panoramic image encoded into one stream on the basis of scenario 2 according to an embodiment of the present invention.

In scenario 2 according to an embodiment of the present invention, a panoramic image may be encoded into one stream and the panoramic image may be divided into a plurality of images using cropping coordinates.

According to scenario 2, one receiver may decode the stream with respect to the entire panoramic image, divide the panoramic image using cropping coordinates and deliver the divided images to other receivers (scenario 21). Alternatively, all receivers may decode the stream with respect to the entire panoramic image and then output only parts to be displayed thereby using cropping coordinates (scenario 22).

In the case of scenario 21, when a scrolling request is input by the user, cropping coordinate values may be moved at the scrolling request of the user in an embodiment of the present invention ((x,y)>(x',y')). Then, the panoramic image may be cropped based on the cropping coordinate values. A main receiver may deliver cropped and divided images to sub-receivers. The sub-receivers may display the divided images delivered thereto.

In the case of scenario 22, when a scrolling request is input by the user, a main receiver that has received the scrolling request may deliver scrolling information to other sub-receivers. All receivers may decode the entire panoramic image. The receivers may move cropping coordinate values at the scrolling request of the user, crop the panoramic image based on the cropping coordinate values and display cropped and divided images.

Figure 16:
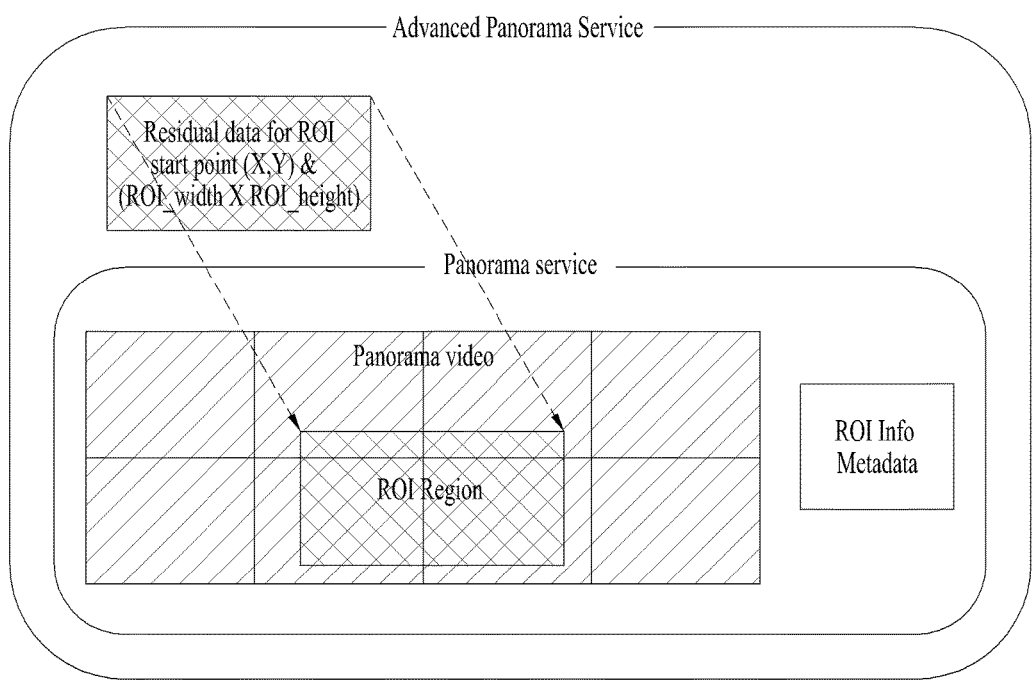
FIG. 16 is a diagram illustrating a panorama service composition based on scenario 4 according to an embodiment of the present invention.

FIG. 16 is a diagram illustrating a panorama service composition based on scenario 4 according to an embodiment of the present invention.

Scenario 4 according to an embodiment of the present invention may provide enhancement data of a part of a panoramic image through an enhancement layer using SHVC and provide signaling information about the enhancement data in order to provide a high definition service for an ROI.

According to an embodiment of the present invention, an ROI in a panoramic image may be designated, and enhancement data added to a base layer signal is encoded into an enhancement layer signal and transmitted for the ROI. When the panoramic image is low resolution, enhancement data may be used to provide a high definition service for the image of the ROI. Accordingly, a panorama service including a high-definition ROI may be provided according to an embodiment of the present invention.

Residual data for ROI illustrated in the figure may refer to the enhancement data and include the width, height and start point coordinates (x, y) of ROI.

FIG. 17 is a diagram illustrating the composition of panorama_composition_info according to an embodiment of the present invention.

Panorama_composition_info according to an embodiment of the present invention may be transmitted in a supplemental enhancement information (SEI) message. The panorama_composition_info may be referred to as panorama_composition_information.

The panorama_composition_info according to an embodiment of the present invention may include a panorama_service_type field, a panorama_composition_info_ver field, a panorama_width_div32 field, a panorama_height_div32 field, a panorama_profile field, a panorama_level field, a panorama_tier field, a panorama_stream_num field, a panorama_view_num field, a panorama_view_priority field, an included_stream_id field, a panorama_composition_metadata( ) field, a panorama_filtering_metadata( ) field, a cropping_region_num field, an extraction_info_metadata( ) field, an ROI_num field, an ROI_codec_type field and/or an ROI_info_metadata( ) field.

The panorama_service_type field may indicate a panorama service corresponding to a relevant program. Detailed description thereof will be given later.

The panorama_composition_info_ver field may indicate the version number of the panorama_composition_info. According to an embodiment of the present invention, when part of data of the panorama_composition_info is changed, the version number may be increased by "1" to indicate an updated version.

The panorama_width_div32 field may indicate a width for signaling the solution of an original panoramic image. The actual width value may be a value obtained by multiplying the panorama_width_div32 field by 32. The panorama_composition_info may include a panorama_aspect_ratio field that indicates aspect ratio information, which is not illustrated in the figure.

The panorama_height_div32 field may indicate a height for signaling the resolution of the original panoramic image. The actual height value may be a value obtained by multiplying the panorama_height_div32 field by 32.

The panorama_profile field may indicate profile information about the panoramic image.

The panorama_level field may indicate level information about the panoramic image.

The panorama_tier field may indicate tier information about the panoramic image. Here, the concept of tier may not be used according to type of a codec. When the tier is not used, signaling may be performed as in the case of a main tier.

The panorama_stream_num field may indicate the number of streams corresponding to divisions of a panoramic image when the panorama_service_type field is 1.

The panorama_view_num field may indicate the number of receivers to which divided panoramic images are transmitted when the panorama_service_type field is 1.

The panorama_view_priority field may indicate priority of divided images when the panorama_service_type field is 1. For example, when only one receiver is provided, a view (image) of highest priority may be output.

The included_stream_id field may indicate the ID of a divided panoramic image when the panorama_service_type field is 1. This field may identify an image displayed through a receiver. According to an embodiment of the present invention, a mask bit may be allocated according to the number of divided streams. For example, when the panorama_view_num field is 10, that is, when a panoramic image is divided into 10 streams, 10 bits may be allocated to the included_stream_id field.

The panorama_composition_metadata( ) field will be described in detail later.

The panorama_filtering_metadata( ) field will be described in detail later.

The cropping_region_num field may indicate the number of cropping coordinate values for dividing a panoramic image when the panorama_service_type is 2. The panorama_composition_info may include a cropping_flag field that may indicate whether a relevant stream is a stream configured to crop the panoramic image into multiple regions.

The extraction_info_metadata( ) field will be described in detail later.

The ROI_num field may indicate the number of regions of interest when the panorama_service_type is 4.

The ROI_codec_type field may indicate the type of a used codec. According to an embodiment of the present invention, S(H)SV corresponding to a scalable codec may be used in order to provide high dynamic range services or color gamut related services for provision of high-definition ROI services. When a temporal scalability service of 120p is provided while the existing service is 60p, the service may be provided using an HEVE(AVC) codec.

The ROI_info_metadata( ) field will be described in detail later.

FIG. 18 is a diagram illustrating a composition of the panorama_service_type according to an embodiment of the present invention.

Referring to the figure, the panorama_service_type may indicate provision of the service of scenario 1 according to an embodiment of the present invention when this type is 001. Scenario 1 may refer to a service of dividing a panoramic image into forms compatible with existing receivers. The panorama_service_type may indicate provision of the service of scenario 2 when this field is 010. Scenario 2 may refer to a service including a whole panoramic image and extraction information. The panorama_service_type may indicate provision of the service of scenario 4 according to an embodiment of the present invention when this field is 011. Scenario 4 may refer to a service for providing a high-definition image with respect to an ROI.

FIG. 19 is a diagram illustrating a composition of the panorama_composition_metadata( ) according to an embodiment of the present.

The panorama_composition_metadata( ) according to an embodiment of the present invention may include a sub_video_profile field, a sub_video_level field, a sub_video_tier field, a sub_video_aspect_ratio field, a sub_video_width_div8 field, a sub_video_height_div8 field, a sub_video_stream_id field and/or a sub_video_afd_bar ( ) field.

The sub_video_profile field may indicate profile information of a divided video stream. If the profile information of the divided video stream is the same as the stream of a panoramic image, signaling that the profile information of the video stream is the same as the stream of the panoramic image may replace additional signaling of the profile information of the video stream.

The sub_video_level field may indicate level information of a divided video stream. If the level information of the divided video stream is the same as the stream of a panoramic image, signaling that the level information of the video stream is the same as the stream of the panoramic image may replace additional signaling of the level information of the video stream.

The sub_video_tier field may indicate tier information of a divided video stream. If the tier information of the divided video stream is the same as the stream of a panoramic image, signaling that the tier information of the video stream is the same as the stream of the panoramic image may replace additional signaling of the tier information of the video stream.

The sub_video_aspect_ratio field, the sub_video_width_div8 field and the sub_video_height_div8 field may respectively indicate aspect ratio, width and height information which are resolution information of a divided video stream. According to an embodiment of the present invention, the sub_video_aspect_ratio field may not be included in the panorama_composition_metadata( )since the aspect ratio information may be inferred through the resolution information.

The sub_video_stream_id field may identify a divided video stream. As described above with respect to an image division method, this field may indicate two-dimensional or one-dimensional coordinate values. When the field is assigned two-dimensional coordinate values, the assigned two-dimensional coordinate values may be mapped to one-dimensional coordinate values. When the field is assigned two-dimensional coordinate values, an embodiment of the present invention may identify a divided video stream with sub_video_stream_id_x and sub_video_stream_id_y and signal the same. According to an embodiment of the present invention, the panorama_composition_metadata( ) may include a sub_video_view_direction field. The sub_video_view_direction field may be signaled along with the sub_video_stream_id field. Left, center and right images, from among images obtained by dividing a panoramic image, may be identified and the direction and order thereof may be signaled through direction information included in the sub_video_view_direction field.

The sub_video_afd_bar ( ) field will be described in detail later.

Figures 20, 21:
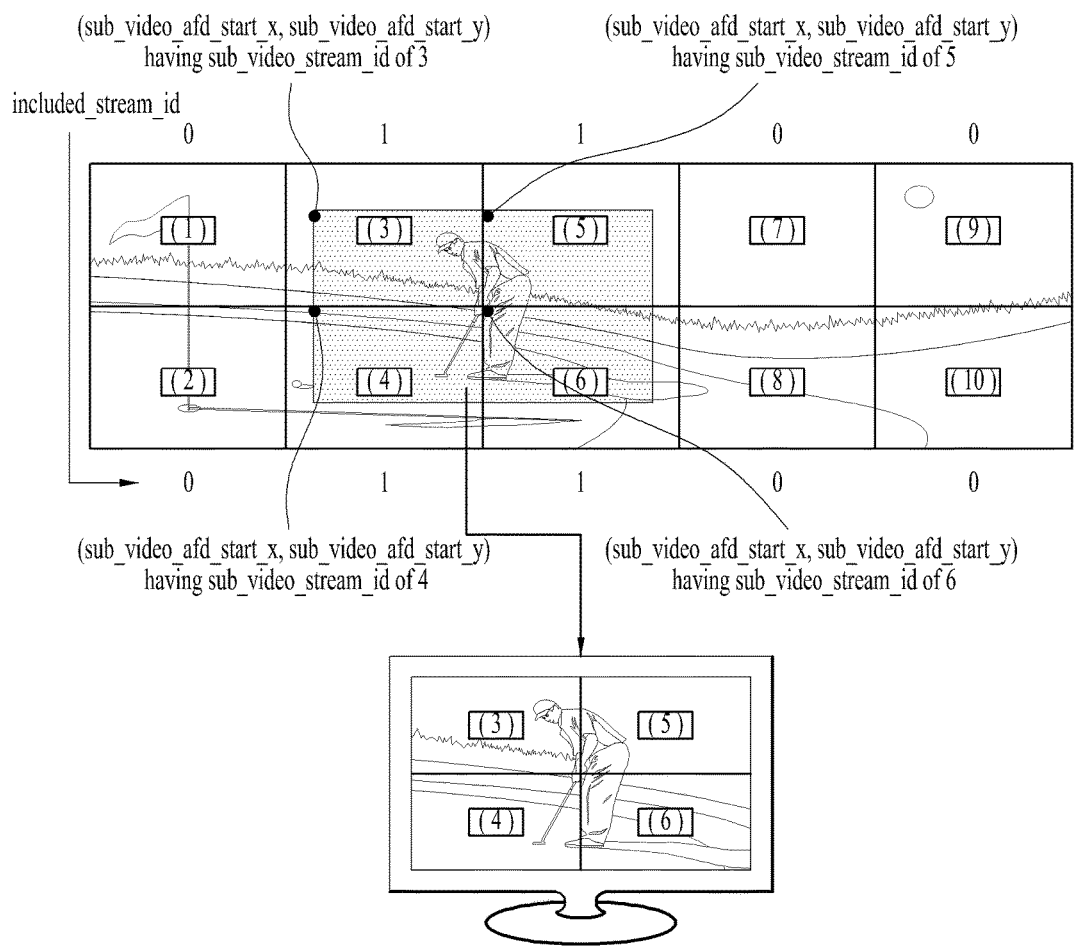
FIG. 20 is a diagram illustrating a composition of sub_video_afd_bar ( ) according to an embodiment of the present invention.
FIG. 21 is a diagram illustrating a method of displaying a partial image having high panorama_view_priority from among partial images forming a panoramic image according to an embodiment of the present invention.

FIG. 20 is a diagram illustrating a composition of sub_video_afd_bar ( ) according to an embodiment of the present invention.

The sub_video_afd_bar ( ) according to an embodiment of the present invention may include a sub_video_afd_start_x_div4 field, a sub_video_afd_start_y_div4 field, a sub_video_afd_width_div4 field and/or a sub_video_afd_height_div4 field.

The sub_video_afd_start_x_div4 field and the sub_video_afd_start_y_div4 field may indicate start coordinate values (x, y) of an active format corresponding to the sub_video_streamid.

The sub_video_afd_width_div4 field and the sub_video_afd_height_div4 field may respectively indicate the width and height of an active format starting at the coordinate values indicated by the sub_video_afd_start_x_div4 field and the sub_video_afd_start_y_div4 field. An actual width and height may be obtained by multiplying the values indicated by the corresponding fields by 4.

FIG. 21 is a diagram illustrating a method of displaying an image having high panorama_view_priority from among partial images that constitute a panoramic image according to an embodiment of the present invention.

According to an embodiment of the present invention, an image to be displayed through a receiver using information included in the panorama_view_priority field and information included in the included_stream_id field. According to an embodiment of the present invention, a part of an image to be displayed may be determined using information included in the sub_video_aft_bar( ) field.

FIG. 22 is a diagram illustrating a composition of the panorama_filtering_metadata( ) according to an embodiment of the present invention.

According to an embodiment of the present invention, a filtering process may be added when divided panorama streams are stitched. The panorama_filtering_metadata( ) according to an embodiment of the present invention may include information necessary for the filtering process. According to an embodiment of the present invention, when a panoramic image is divided, encoded and then decoded, blocking artifacts are present at boundaries of images and thus filtering needs to be applied.

The panorama_filtering_metadata( ) according to an embodiment of the present invention may include a panorama_filtering_num field, a panorama_filtering_coordinate_x_div4 field, a panorama_filtering_coordinate_y_div4 field, a panorama_filtering_width_div4 field, a panorama_filtering_height_div4 field and/or a smoothing_filter_coeff( ) field.

The panorama_filtering_num field may indicate whether filtering is applied and/or the number of filtering processes.

The panorama_filtering_coordinate_x_div4 field and the panorama_filtering_coordinate_y_div4 field may indicate the first pixel coordinates of a part to which filtering is applied. Actual coordinates may be obtained by multiplying the values indicated by the panorama_filtering_coordinate_x_div4 and panorama_filtering_coordinate_y_div4 fields by 4. Here, the actual coordinates may be based on the restored panoramic image.

The panorama_filtering_width_div4 field and the panorama_filtering_height_div4 field may indicate the size (width and height) of a region to which filtering needs to be applied. The actual size may be obtained by multiplying the values of these fields by 4.

The smoothing_filter_coeff( ) field may indicate a most suitable smoothing filter coefficient per content item.

FIG. 23 is a diagram illustrating a composition of the extraction_info_metadata( ) according to an embodiment of the present invention.

The extraction_info_metadata( ) according to an embodiment of the present invention may include a sub_video_width_div8 field, a sub_video_height_div8 field, a sub_video_aspect_ratio field, a sub_video_view_id field, a sub_video_priority field, a sub_video_cropping_start_x_div8 field, a sub_video_cropping_start_y_div8 field and/or a sub_video_afd_bar( ) field.

The sub_video_width_div8 field, the sub_video_height_div8 field and the sub_video_aspect_ratio field may indicate width, height and aspect ratio information corresponding to resolution information of a sub-video to be separated or cropped.

The sub_video_view_id field may indicate an ID for identifying a cropped image.

The sub_video_priority field may indicate priority of an image to be cropped.

The sub_video_cropping_start_x_div8 field and the sub_video_cropping_start_y_div8 field may indicate the start point (x, y) of coordinate values for separating a sub-video from a panoramic image. Actual coordinates may be obtained by multiplying the values of each field by 8. Here, the extraction_info_metadata( ) may include a field indicating the end point (x, y) of the coordinate values.

The sub_video_afd_bar( ) field is identical to the sub_video_afd_bar( ) field included in the aforementioned panorama_composition_metadata( ) which has been described above.

Figures 24, 25:
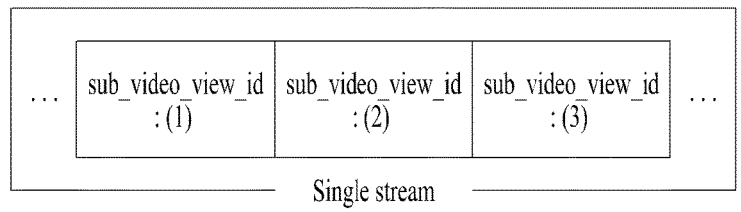
FIG. 24 is a diagram illustrating a composition of one video stream based on scenario 2 according to an embodiment of the present invention.
FIG. 25 is a diagram illustrating a composition of ROI_info_metadata( ) according to an embodiment of the present invention.

FIG. 24 is a diagram illustrating a composition of a video stream based on scenario 2 according to an embodiment of the present invention.

While one stream is formed for a panoramic image, the image may be divided by assigning a fixed ID to each region to be cropped according to an embodiment of the present invention. In this case, an embodiment of the present invention may divide and/or separate the panoramic image using sub_video_stream_id without information about coordinate values for cropping. Accordingly, the number of bits may be reduced. According to an embodiment of the present invention, the number of bits may be decreased using the sub_video_stream_id, compared to a method of dividing a panoramic image using coordinate values for cropping.

FIG. 25 is a diagram illustrating a composition of ROI_info_metadata( ) according to an embodiment of the present invention.

According to an embodiment of the present invention, additional information about an ROI may be signaled through the ROI_info_metadata( ). Since basic information about a panoramic image is provided by default, an embodiment of the present invention may additionally deliver the additional information about the ROI in a decoded base layer stream. Here, the ROI may be referred to as a region of interest. The additional information may be referred to as enhancement data and/or residual data.

The ROI_info_metadata( ) according to an embodiment of the present invention may include an ROI_video_profile field, an ROI_video_level field, an ROI_video_tier field, an ROI_video_priority field, an ROI_video_dynamic_range field, an ROI_video_color_gamut field, an ROI_video_width_div8 field, an ROI_video_height_div8 field, an ROI_start_x_div8 field, an ROI_start_y_div8 field and/or an ROI_filtering_info_descriptor( ).

The ROI_video_profile field, the ROI_video_level field and the ROI_video_tier field may indicate profile, level and tier information about an ROI.

The ROI_video_priority field may indicate priority of regions of interest, which is indicated by the aforementioned ROI_num. According to an embodiment of the present invention, high-definition services may be provided according to priority and the user may select a service.

The ROI_video_dynamic_range field and the ROI_video_color_gamut field may indicate the dynamic range and color gamut of the ROI. According to an embodiment of the present invention, high-definition ROI services may be provided through a higher frame rate, a high dynamic range, a wide color gamut, a chroma subsampling (4:2:2 or 4:4:4), higher resolution and the like. The high frame rate, chroma subsampling (4:2:2 or 4:4:4) and higher resolution may be identified by a level (higher frame rate and higher resolution) and a profile (chroma subsampling) and signaled. ROI_info_metadata( ) according to another embodiment of the present invention may include fields that signal a high frame rate, chroma subsampling (4:2:2 or 4:4:4) and/or higher resolution. The profile according to an embodiment of the present invention may be identified for chroma subsampling as well as for bit depth.

The ROI_video_width_div8 field and the ROI_video_height_div8 field indicate the resolution of the ROI. Here, actual resolution may correspond to (ROI_video_width_div8 field value*8)*(ROI_video_height_div8 field value*8). The ROI_info_metadata( ) according to an embodiment of the present invention may include a field indicating the aspect ratio of the ROI.

The ROI_start_x_div8 field and the ROI_start_y_div8 field may indicate the start coordinate values (x,y) of the ROI. The coordinate values (x,y) are values with the whole panoramic image and actual coordinate values may be obtained by multiplying the value of each field by 8. Another embodiment of the present invention may signal the end point of the ROI instead of the start point thereof. An ROI service according to an embodiment of the present invention may be provided through the ROI_start_x_div8, ROI_start_y_div8, ROI_video_width_div8 and/or ROI_video_height_div8 fields.

The ROI_filtering_info_descriptor( ) may include information about a filtering process necessary when an enhancement layer signal of the ROI is merged with a base layer signal. According to an embodiment of the present invention, filtering may be added when the enhancement layer signal of the ROI is merged with the base layer signal. Here, the ROI_filtering_info_descriptor( ) may include the fields included in the aforementioned panorama_filtering_metadata( ).

FIG. 26 is a diagram illustrating a composition of a service description table (SDT).

The SDT according to an embodiment of the present invention may include a table_id field, a section_syntax_indicator field, a section_length field, a transport_stream_id field, a version_number field, a current_next_indicator field, a section_number field, a last_section_number field, an original_network_id field, a service_id field, an EIT_schedule_flag field, an EIT_present_following_flag field, a running_status field, a free_CA_mode field, a descriptors_loop_length field, a descriptor( ) and/or a CRC_32 field.

The table_id field identifies the type of the table. The table_id field may indicate that a relevant table section constitutes the SDT.

The section_syntax_indicator field indicates the format of a table section following the field. When the field is 0, the table section indicates a short format. When the field is 1, the table section conforms to a general long format. (section_syntax_indicator: the section_syntax_indicator is a 1-bit field which shall be set to "1".)

The section_length field indicates the length of the relevant table section. The section_length field may indicate the length from the field to the end of the table section. (section_length: this is a 12-bit field, the first two bits of which shall be "00". It specifies the number of bytes of the section, starting immediately following the section_length field and including the CRC. The section_length shall not exceed 1,021 so that the entire section has a maximum length of 1,024 bytes.)

The transport_stream_id field identifies a transport stream (TS) described in the table. (transport_stream_id: this is a 16-bit field which serves as a label for identification of the TS, about which the SDT informs, from any other multiplex within the delivery system.)

The version_number field indicates the version number of a private table section. A receiver may detect a latest table section from among table sections stored in a memory using the field and the current_next_indicator field which will be described later. (version_number: this 5-bit field is the version number of the sub_table. The version_number shall be incremented by 1 when a change in the information carried within the sub_table occurs. When it reaches value "31", it wraps around to "0". When the current_next_indicator is set to "1", then the version_number shall be that of the currently applicable sub_table. When the current_next_indicator is set to "0", then the version_number shall be that of the next applicable sub_table.)

The current_next_indicator field indicates that the currently delivered table is valid when the value thereof is 1 and indicates that the currently delivered table is not currently valid but will be valid when the value thereof is 0. (current_next_indicator: this 1-bit indicator, when set to "1" indicates that the sub_table is the currently applicable sub_table. When the bit is set to "0", it indicates that the sub_table sent is not yet applicable and shall be the next sub_table to be valid.)

The section_number field indicates the number of the relevant section in the table. (section_number: this 8-bit field gives the number of the section. The section_number of the first section in the sub_table shall be "0x00". The section_number shall be incremented by 1 with each additional section with the same table_id, transport_stream_id, and original_network_id.)

The last_section_number field indicates the number of the last section from among sections constituting the table. (last_section_number: this 8-bit field specifies the number of the last section (that is, the section with the highest section_number) of the sub_table of which this section is part.)

The original_network_id field may identify an originating broadcast station that transmits the service described in the table. (original_network_id: this 16-bit field gives the label identifying the network_id of the originating delivery system.)

The service_id field identifies each service present within a transport stream. The service_id field may have the same function as the program_number field in a PMT. (service_id: this is a 16-bit field which serves as a label to identify this service from any other service within the TS. The service_id is the same as the program_number in the corresponding program_map_section.)

The EIT_schedule_flag field indicates that an EIT schedule flag is present in the current TS when having a value of 1 and indicates that the EIT schedule flag is not present when having a value of 0. (EIT_schedule_flag: this is a 1-bit field which when set to "1" indicates that EIT schedule information for the service is present in the current TS, see TR 101 211 [i.2] for information on maximum time interval between occurrences of an EIT schedule sub_table. If the flag is set to 0 then the EIT schedule information for the service should not be present in the TS.)

The EIT_present_following_flag field indicates that EIT_present_following information for a service is present within the current TS when having a value of 1 and indicates that the EIT_present_following information is not present when having a value of 0. (EIT_present_following_flag: this is a 1 bit field which when set to "1" indicates that EIT_present_following information for the service is present in the current TS, see TR 101 211 [i.2] for information on maximum time interval between occurrences of an EIT present/following sub_table. If the flag is set to 0 then the EIT present/following information for the service should not be present in the TS.)

The running_status field indicates a service status. For example, the running_status field may indicate that a relevant service is "not running" when having a value of 1, indicate that the service "starts in a few seconds" when having a value of 2, indicate the service is "pausing" when having a value of 3, indicate that the service is "running" when having a value of 4 and indicate that "service offair" when having a value of 5. (running_status: this is a 3-bit field indicating the status of the service as defined in table 6. For an NVOD reference service the value of the running_status shall be set to "0".)

The free_CA_mode field indicates that component streams of a service have not been scrambled when having a value of 0 and indicates that access to one or more streams is controlled by a CA system when having a value of 1. CA system is short for conditional access system and refers to a system that provides a broadcast content encoding function and a function of allowing only subscribers to decode encoded broadcast content to view the broadcast content in order to limit broadcast content users to subscribers. (free_CA_mode: this 1-bit field, when set to "0" indicates that all the component streams of the service are not scrambled. When set to "1" it indicates that access to one or more streams may be controlled by a CA system.)

The descriptors_loop_length field indicates the total length of descriptors following the field. (descriptors_loop_length: this 12-bit field gives the total length in bytes of the following descriptors.)

The descriptor( ) refers to a descriptor describing each service. According to an embodiment of the present invention, the aforementioned panorama_composition_info may be included in the descriptor( ) in order to provide the panorama service and/or program guide information.

The CRC_32 field indicates a CRC value used to check whether data included in the relevant table section has an error. (CRC_32: this is a 32-bit field that contains the CRC value that gives a zero output of the registers in the decoder.)

FIG. 27 is a diagram illustrating a composition of an event information table (EIT) according to an embodiment of the present invention.

The EIT according to an embodiment of the present invention includes a table_id field, a section_syntax_indicator field, a section_length field, a service_id field, a version_number field, a current_next_indicator field, a section_number field, a last_section_number field, a transport_stream_id field, an original_network_id field, a segment_last_section_number field, a last_table_id field, an event_id field, a start_time field, a duration field, a running_status field, a free_CA_mode field, a descriptors_loop_length field, a descriptor( ) field and/or a CRC_32 field.

The table_id field identifies the type of the table. The table_id may indicate that a relevant table section constitutes the EIT.

The section_syntax_indicator field indicates the format of the table section following the field. This field indicates that the table section is a short format when having a value of 0 and indicates that the table section conforms to the general long format when having a value of 1.

The section_length field indicates the length of the relevant table section. The section_length field may indicate the length from the field to the end of the table section.

The service_id field identifies each service present within a transport stream. The service_id field may have the same function as the program_number field in the PMT.

The version_number field indicates the version number of private table section. A receiver may detect a latest table section from among table sections stored in a memory using the field and the current_next_indicator field which will be described later.

The current_next_indicator field indicates that the currently delivered table is valid when the value thereof is 1 and indicates that the currently delivered table is not currently valid but will be valid when the value thereof is 0.

The section_number field indicates the number of the relevant section in the table.

The last_section_number field indicates the number of the last section from among sections constituting the table.

The transport_stream_id field identifies a transport stream (TS) described in the table.

The original_network_id field may identify an originating broadcast station that transmits the service or event described in the table.

The segment_last_section_number field indicates the last section number of the relevant segment when a sub table is present. When the sub table is not segmented, the value indicated by this field may be the same as the value indicated by the last_section_number field.

The last_table_id field indicates the ID of a used last table.

The event_id field identifies each event and has a unique value within one service.

The start_time field indicates the start time of the relevant event.

The duration field indicates the duration of the relevant event. For example, when the duration of a program is 1 hour 45 minutes 30 seconds, the duration field may indicate 0x014530.

The running_status field indicates the status of the relevant event.

The free_CA_mode field indicates that component streams of a service have not been scrambled when having a value of 0 and indicates that access to one or more streams is controlled by a CA system when having a value of 1. CA system is short for conditional access system and refers to a system that provides a broadcast content encoding function and a function of allowing only subscribers to decode encoded broadcast content to view the broadcast content in order to limit broadcast content users to subscribers.

The descriptors_loop_length field indicates the total length of descriptors following the field.

The descriptor( ) refers to a descriptor describing each service. According to an embodiment of the present invention, the aforementioned panorama_composition_info may be included in the descriptor( ) in order to provide the panorama service and/or program guide information.

The CRC_32 field indicates a CRC value used to check whether data included in the relevant table section contains an error.

The EIT according to an embodiment of the present invention may be delivered in the form of a table within a TS or delivered in the form of xml through IP streaming.

FIG. 28 is a diagram illustrating a composition of linkage_descriptor( ) included in the EIT according to an embodiment of the present invention.

According to an embodiment of the present invention, the linkage_descriptor( ) may be included in an event level descriptor of the EIT.

The linkage_descriptor( ) according to an embodiment of the present invention may include a descriptor_length field, a transport_stream_id field, an original_network_id field, a service_id field, a linkage_type field and/or advanced_event_linkage_info( ).

The descriptor_tag field may indicate that the descriptor is a linkage_descriptor.

The descriptor_length field may indicate the length of the descriptor.

The transport_stream_id field may indicate the ID of a TS including an information service. (This is a 16-bit field which identifies the TS containing the information service indicated.)

The original_network_id field may indicate the network id of an originating delivery system of the information service. (This 16-bit field gives the label identifying the network_id of the originating delivery system of the information service indicated.)

The service_id field may identify information service within a TS. (This is a 16-bit field which uniquely identifies an information service within a TS. The service_id is the same as the program_number in the corresponding program_map_section. If the linkage_type field has the value 0x04, then the service_id field is not relevant, and shall be set to 0x0000.)

The linkage_type field may indicate the type of linkage for the information service. (This is an 8-bit field specifying the type of linkage.)

The advanced_event_linkage_info( ) will be described in detail later.

According to an embodiment of the present invention, when a panorama event and/or service corresponding to a broadcast service currently viewed by the user are indicated, 0x0F may be used as the linkage_type type. When an HD and/or 3D service corresponding to a panorama event and/or service currently viewed by the user are indicated, 0x0E may be used as the linkage_type type. In addition, when a UHD service corresponding to a panorama event and/or service currently viewed by the user is indicated, 0x0E may be used as the linkage_type type.

FIG. 29 is a diagram illustrating the type of a target service according to link_type when linkage_type is 0x0E according to an embodiment of the present invention.

According to an embodiment of the present invention, a link_type value of 0 may indicate that the target service is an SD service and a link_type value of 1 may indicate that the target service is an HD service. A link_type value of 2 may indicate that the target service is a frame compatible plano-stereoscopic service and a link_type value of 3 may indicate that the target service is a service compatible plano-stereoscopic service.

Referring to the figure, when the linkage_type is 0x0E, there is no remaining bit in the link_type assigned two bits, and thus an embodiment of the present invention may assign a new linkage_type value of 0x0F and signal that a target event and/or service are panorama event and/or service using a combination of a link_type value and a linkage_type value. Here, when the target service is an SD or HD service, extended_event_linkage_info( ) may be used without being modified.

According to an embodiment of the present invention, when the linkage_type is 0x0F, advanced_event_linkage_info( ) may include a link_type field indicating that a target event and/or service are a panorama event and/or service, which will be described in detail later.

FIG. 30 is a diagram illustrating a composition of advanced_event_linkage_info( ) according to an embodiment of the present invention.

According to an embodiment of the present invention, when the linkage_type field is 0x0F, the advanced_event_linkage_info( ) that signals a panorama event and/or service may be included in the linkage_descriptor.

The advanced_event_linkage_info( ) according to an embodiment of the present invention may include num_link_event, link_simulcast, link_delivery_type, detail_info_flag, link_type, link_event_id, link_original_network_id, link_transport_stream_id, link_service_id, delivery_detail_info( ) and/or time_shift_detail_info( ) fields.

The num_link_event may indicate the number of links.

The link_simulcast field may indicate whether a relevant event and/or service are broadcast simultaneously with the current event and/or service. For example, when the value of the link_simulcast field is 1, the link_simulcast field may indicate that the relevant event and/or service and the current event and/or service are simultaneously broadcast without a time difference therebetween.

The link_delivery_type field may indicate the type of a path (terrestrial, satellite, cable, IP and the like) through which the relevant event and/or service are broadcast. When the relevant event and/or service are broadcast through the same path or the same scheme, "001" may be designated as the link_delivery_type field. If a different transport parameter (e.g., a modulation scheme related parameter) is used for the same path, information corresponding to the path may be designated (e.g., a value between "010" and "100"), and detailed parameter information may be signaled through delivery_detail_info( ) which will be described later. Here, the link_delivery_type field may signal the same delivery path of the same event, such as cable, IP or terrestrial.

The detail_info_flag field may indicate whether information about a physical delivery parameter regarding a linked event and/or service is included.

The link_type field indicates the service type of the relevant event or service. For example, values of the detail_info_flag field may indicate the following UHD video information and/or panorama service information. "001" indicates 4K UHD, 8 bits and 4:2:0, "010" indicates 4K UHD, 10 bits and 4:2:0, "011" indicates 4K UHD, 10 bits and 4:2:2, "0x10" indicates panorama, "0x11" indicates panorama, HDR provision, WCG provision.

The link_event_id, link_original_network_id, link_transport_stream_id and link_service_id fields may respectively indicate event_id, original_network_id, transport_stream_id and service_id of the relevant event and/or service.

The delivery_detail_info( ) indicates a physical delivery parameter about a linked event and/or service. For example, information such as a modulation scheme, frequency information and an FEC scheme of delivered event data may be signaled using the delivery_detail_info( ).

The time_shift_detail_info( ) may signal information about a time difference between a linked event and/or service and the current event and/or service when the time difference is present. A field indicating a time shift for broadcasting in minutes may be included in the time_shift_detail_info( ) according to an embodiment. As another example of signaling the time difference, the event_id and time information about the event identified with the event_id may be referred to in a related EIT.

FIG. 31 is a diagram illustrating a composition of a program map table (PMT) and the position of panorama_composition_info( ) included in the PMT.

According to an embodiment of the present invention, the panorama_composition_info( ) may be divided into a program level and a video (stream) level in the PMT and signaled at respective levels.

The PMT according to an embodiment of the present invention includes table_id, section_syntax_indicator, section_length, program_number, version_number, current_next_indicator, section_number, last_section_number, PCR_PID, program_info_length, descriptor( ) stream_type, elementary_PID, ES_info_length, descriptor( ) and/or CRC_32 fields.

The table_id field identifies the type of the table. The table_id field may indicate whether a relevant table section constitutes the PMT.

The section_syntax_indicator field indicates the format of the table section following the field. When the section_syntax_indicator field is 0, the relevant table section is in a short format. When the section_syntax_indicator field is 1, the relevant table section is in the general long format.

The section_length field indicates the length of the relevant table section. Since the section_length field indicates the length from the field to the end of the table section, the actual length of the table section may be obtained by adding 3 bytes to the value indicated by the section_length field.

The program_number field identifies each program service or virtual channel present in a transport stream.

The version_number field indicates the version number of a private table section. A receiver may detect a latest section from among table sections stored in a memory using this field and the current_next_indicator field which will be described later.

A current_next_indicator field value of 1 indicates that the currently delivered table is valid and a current_next_indicator field value of 0 indicates that the currently delivered table is not currently valid but will be valid.

The section_number field indicates the number of a relevant section in the table.

The last_section_number field indicates the number of the last section from among sections constituting the table.

The PCR_PID field indicates a packet ID corresponding to a program clock reference (PCR) for a program service.

The program_info_length field indicates the length of a descriptor describing the following program information.

The descriptor( ) refers to a descriptor that describes a program corresponding to the relevant table section. According to an embodiment of the present invention, the panorama_service_type, panorama_composition_info_ver, panorama_width_div32, panorama_height_div32, panorama_profile, panorama_level and/or panorama_tier fields, from among the fields included in the panorama_composition_info, may be included in the descriptor signaled at the program level of the PMT.

The stream_type field indicates the type of each unit stream that constitutes the program described by the table.

The elementary_PID field indicates the packet ID of each unit stream that constitutes the program described by the table. According to an embodiment of the present invention, when a panoramic image is divided into a plurality of images and a plurality of streams including the divided images is present, this field may allocate different elementary_PID values to the respective streams.

The ES_info_length field indicates the length of a descriptor describing information ES_info about following unit streams.

The descriptor( ) refers to a descriptor that indicates information about one of unit streams constituting the program described by the table. According to an embodiment of the present invention, the panorama_stream_num, panorama_view_num, panorama_view_priority, included_stream_id, panorama_composition_metadata( ), panorama_filtering_metadata( ), cropping_region_num, extraction_info_metadata( ), ROI_num, ROI_codec_type and/or ROI_info_metadata( ) fields, from among the fields included in the panorama_composition_info, may be included in the descriptor signaled at the video (stream) level of the PMT.

The CRC_32 field indicates a CRC value used to check whether data included in the relevant table section contains an error.

The PMT according to an embodiment of the present invention may be delivered in band through MPEGTS or PSI including the PMT may be delivered in the form of xml through IP.

FIG. 32 is a diagram illustrating a composition of a terrestrial virtual channel table (TVCT) according to an embodiment of the present invention.

The panorama_composition_info according to an embodiment of the present invention may be included in a channel level descriptor of the TVCT.

The TVCT according to an embodiment of the present invention may include table_id, section_syntax_indicator, private_indicator, section_length, transport_stream_id, version_number, current_next_indicator, section_number, last_section_number, protocol_version, num_channels_in_section, short_name, major_channel_number, minor_channel_number, modulation mode, carrier_frequency, channel_TSID, program_number, ETM_location, access_controlled, hidden, hide_guide, service_type, source_id, descriptors_length and/or descriptor( ) fields.

The table_id field identifies the table.

The section_syntax_indicator field is a 1-bit field set to 1 to indicate the long form of the MPEG2 private_section table. (This 1-bit field shall be set to "1" to always indicate the "long" form of the MPEG2 private_section table.)

The private_indicator field is a 1-bit field set to 1. (This 1 bit field shall be set to '1'.)

The section_length field indicates the length of the table section following this field in bytes. (This is a 12-bit field, the first two bits of which shall be "00". It specifies the number of bytes of the section, starting immediately following the section_length field and including the CRC. The section_length shall not exceed 1021 so that the entire section has a maximum length of 1024 bytes.)

The transport_stream_id field indicates the id of an MPEG2 transport stream (TS) within the table. (To distinguish each transport stream within a single network (terrestrial, cable or satellite) from another, MPEG2 established the use of a 16 bit (ranging from 0 to 65535) transport_stream_identifier, which is also called a TSID.)

The version_number field is a 5-bit field indicating the version number of the table. (This 5-bit field is the version number of the PSIP_section. The version_number shall be incremented by 1 modulo 32 when a change in the information carried within the PSIP_section occurs. When the current_next_indicator is set to '0', then the version_number shall be that of the next applicable PSIP_section with the same table_id, table_id_extension, and section_number.)

The current_next_indicator field is a 1-bit field and indicates whether the table is currently applicable or applicable next time. (A 1-bit field, which when set to '1' indicates that the PSIP_section sent is currently applicable. When the current_next_indicator is set to '1', then the version_number shall be that of the currently applicable PSIP_section. When the bit is set to '0', it indicates that the PSIP_section sent is not yet applicable and shall be the next PSIP_section with the same section_number, table_id_extension, and table_id to become valid.)

The section_number field indicates a section_number. (This 8-bit field gives the number of the PSIP_section. The section_number of the first section in a PSIP table shall be 0x00. The section_number shall be incremented by 1 with each additional section in PSIP table. The scope of the section_number shall be defined by the table_id and table_id_extension. That is, for each PSIP table and value of the table_id_extension field, there is the potential for the full range of section_number values.)

The last_section_number field identifies the number of the last section. (This 8-bit field specifies the number of the last section (that is, the section with the highest section_number) of the PSIP table of which this section is a part. Its scope is the same as for the section_number field.)

The protocol_version field has a function to allow the current table type to carry parameters different from parameters defined in the current protocol in the future. (An 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.)

The num_channels_in_section field indicates the number of virtual channel definitions. (The num_channels_in_section field in ATSC Cable Virtual Channel table CVCT table sections is an 8-bit field that indicates the number of virtual channel definitions to follow in the table section.)

The short_name field is a 112-bit field indicating a short name for a virtual channel (The short_name field is a 112-bit field in ATSC CVCT table sections that gives the short_name for the virtual channel Each letter of the short_name is formatted as a 16-bit Unicode character, with the high order byte transmitted first. So, short_name for TVCT and CVCT entries is seven Unicode characters, which short_name for SVCT entries is eight Unicode characters. If the display name is less than the number of permitted characters, 0/0x00 is appended to the end until the allotted number of bits has been reached.)

The major_channel_number field indicates the number of major channels associated with a virtual channel. (A 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between 1 and 99. The value of major_channel_number shall be set such that in no case is a major_channel_number/minor_channel_number pair duplicated within the TVCT.)

The minor_channel_number field indicates the number of minor channels associated with a virtual channel. (A 10-bit number in the range 0 to 999 that represents the "minor" or "sub" channel number. This field, together with major_channel_number, performs as a two-part channel number, where minor_channel_number represents the second or right-hand part of the number. When the service_type is analog television, minor_channel_number shall be set to 0.)

The modulation mode field indicates a modulation scheme for a transport carrier of a virtual channel (The modulation_mode is an 8-bit field in a virtual channel entry tells receivers the modulation used to transmit individual channels.)

The carrier_frequency field transmits carrier frequency information used for virtual channel transport. (The carrier frequency is a 32-bit field that transmits the carrier frequency used by the transport carrying the virtual channel.)

The channel_TSID field indicates the MPEG2 transport stream ID of a TS carrying an MPEG2 program associated with a virtual channel. (The channel_TSID is a 16-bit unsigned integer field that gives the transport_stream_id of the channel that carries (or for inactive channels, will carry) the virtual channel).

The program_number field identifies each program service or virtual channel within a TS. (The program_number is a 16-bit unsigned integer that uniquely identifies each program service (or virtual channel) present in a transport stream.)

The ETM_location field indicates presence or absence of an extended text message for a channel, event or data event. (The ETM_location field denotes whether there is an extended text message for the channel (Channel Extended Text table or CETT), event (Event Extended Text table) or data event (Data Extended Text table).)

The access_controlled field indicates whether an event associated with a relevant virtual channel is controllable. (When access_controlled is set to '1', means that events associated with this virtual channel may be access controlled. When set to '0', access to event is not controlled.)

The hidden field indicates whether a relevant channel is accessible by a direct entry (or field, attribute or entity) of a virtual channel number. (When hidden is set to '1', means the channel cannot be accessed by direct entry of the virtual channel number. When set to '0', virtual can be accessed by direct entry.)

The hide_guide field indicates whether a relevant channel is accessible by the direct entry (or field, attribute or entity) of the virtual channel number. (When hide_guide is set to '1', means the channel cannot be accessed by direct entry of the virtual channel number. When set to '0', virtual can be accessed by direct entry.)

The service_type field identifies the type of a service set in a virtual channel (The service_type is a 6 bit enumerated field that identifies the type of service set in the virtual channel) Service_type of the panorama service according to an embodiment of the present invention may be designated as a parameterized service (0x07), an extended parameterized service (0x09) and/or a new DTV service panorama service (0x10). The aforementioned service names and values are exemplary and may be set to other names or values.

The source_id field is a 16-bit unsigned integer and indicates a programming source associated with a virtual channel. (A 16-bit unsigned integer number that identifies the programming source associated with the virtual channel. In this context, a source is one specific source of video, text, data, or audio programming Source ID value zero is reserved. Source ID values in the range 0x0001 to 0x0FFF shall be unique within the Transport Stream that carries the VCT, while values 0x1000 to 0xFFFF shall be unique at the regional level. Values for source_ids 0x1000 and above shall be issued and administered by a Registration Authority designated by the ATSC.)

The descriptors_length field signals the length in bytes of the following descriptor field. (The descriptors_length is a 10 bit unsigned integer field that signals the length in bytes of the descriptor field to follow. If there are no descriptors present, zero would be appropriate.)

The descriptor( ) field is a descriptor loop located within the table. The descriptor loop may include an additional descriptor. The panorama_composition_info according to an embodiment of the present invention may be included in the descriptor( ).

FIG. 33 is a diagram illustrating a composition of a cable virtual channel table (CVCT) according to an embodiment of the present invention.

The panorama_composition_info according to an embodiment of the present invention may be included in a channel level descriptor of the CVCT.

The CVCT may include table_id, section_syntax_indicator, private_indicator, section_length, transport_stream_id, version_number, current_next_indicator, section_number, last_section_number, protocol_version, num_channels_in_section, short_name, major_channel_number, minor_channel_number, modulation mode, carrier_frequency, channel_TSID, program_number, ETM_location, access_controlled, hidden, path_select, out_of_band, hide_guide, service_type, source_id, descriptors_length and/or descriptor( ) fields.

The table_id field identifies the table.

The section_syntax_indicator is a 1-bit field set to 1 to indicate a long form of an MPEG2 private_section table. (This 1-bit field shall be set to "1" to always indicate the "long" form of the MPEG2 private_section table.)

The private_indicator field is a 1-bit field set to 1. (This 1 bit field shall be set to "1".)

The section_length field indicates the length in bytes of the following table section. (This is a 12-bit field, the first two bits of which shall be "00". It specifies the number of bytes of the section, starting immediately following the section_length field and including the CRC. The section_length shall not exceed 1021 so that the entire section has a maximum length of 1024 bytes.)

The transport_stream_id field indicates the id of an MPEG2 TS within the table. (To distinguish each transport stream within a single network (terrestrial, cable or satellite) from another, MPEG2 established the use of a 16 bit (ranging from 0 to 65535) transport_stream_identifier, which is also called a TSID.)

The version_number field is a 5-bit field indicating the version number of the table. (This 5-bit field is the version number of the PSIP_section. The version_number shall be incremented by 1 modulo 32 when a change in the information carried within the PSIP_section occurs. When the current_next_indicator is set to "0", then the version_number shall be that of the next applicable PSIP_section with the same table_id, table_id_extension, and section_number.)

The current_next_indicator field is a 1-bit field and indicates whether the table is currently applicable or applicable next time. (A 1 bit field, which when set to "1" indicates that the PSIP_section sent is currently applicable. When the current_next_indicator is set to "1", then the version_number shall be that of the currently applicable PSIP_section. When the bit is set to "0", it indicates that the PSIP_section sent is not yet applicable and shall be the next PSIP_section with the same section_number, table_id_extension, and table_id to become valid.)

The section_number field indicates the number of a section. (This 8-bit field gives the number of the PSIP_section. The section_number of the first section in a PSIP table shall be 0x00. The section_number shall be incremented by 1 with each additional section in PSIP table. The scope of the section_number shall be defined by the table_id and table_id_extension. That is, for each PSIP table and value of the table_id_extension field, there is the potential for the full range of section_number values.)

The last_section_number field identifies the number of the last section. (This 8-bit field specifies the number of the last section (that is, the section with the highest section_number) of the PSIP table of which this section is a part. Its scope is the same as for the section_number field.)

The protocol_version field has a function to allow the current table type to carry parameters different from parameters defined in the current protocol in the future. (An 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.)

The num_channels_in_section field indicates the number of virtual channel definitions. (The num_channels_in_section field in ATSC Cable Virtual Channel table CVCT table sections is an 8-bit field that indicates the number of virtual channel definitions to follow in the table section.)

The short_name field is a 112-bit field indicating a short name for a virtual channel (The short_name field is a 112-bit field in ATSC CVCT table sections that gives the short_name for the virtual channel Each letter of the short_name is formatted as a 16-bit Unicode character, with the high order byte transmitted first. So, short_name for TVCT and CVCT entries is seven Unicode characters, which short_name for SVCT entries is eight Unicode characters. If the display name is less than the number of permitted characters, 0/0x00 is appended to the end until the allotted number of bits has been reached.)

The major_channel_number field indicates the number of major channels associated with a virtual channel (A 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between 1 and 99. The value of major_channel_number shall be set such that in no case is a major_channel_number/minor_channel_number pair duplicated within the TVCT.)

The minor_channel_number field indicates the number of major channels associated with a virtual channel. (A 10-bit number in the range 0 to 999 that represents the "minor" or "sub" channel number. This field, together with major_channel_number, performs as a two-part channel number, where minor_channel_number represents the second or right-hand part of the number. When the service_type is analog television, minor_channel_number shall be set to 0.)

The modulation mode field indicates a modulation scheme for a transport carrier of a virtual channel (The modulation_mode is an 8-bit field in a virtual channel entry tells receivers the modulation used to transmit individual channels.)

The carrier_frequency field transmits carrier frequency information used by transport carrying a virtual channel. (The carrier frequency is a 32 bit field that transmits the carrier frequency used by the transport carrying the virtual channel.)

The channel_TSID field indicates the MPEG2 transport stream ID of a TS carrying an MPEG2 program associated with a virtual channel (The channel_TSID is a 16 bit unsigned integer field that gives the transport_stream_id of the channel that carries (or for inactive channels, will carry) the virtual channel.)

The program_number field identifies each program service or virtual channel within a TS. (The program_number is a 16 bit unsigned integer that uniquely identifies each program service (or virtual channel) present in a transport stream.)

The ETM_location field indicates presence or absence of an extended text message for a channel, event or data event. (The ETM_location field denotes whether there is an extended text message for the channel (Channel Extended Text table or CETT), event (Event Extended Text table) or data event (Data Extended Text table).)

The access_controlled field indicates whether an event associated with a relevant virtual channel is controllable. (When access_controlled is set to "1", means that events associated with this virtual channel may be access controlled. When set to "0", access to event is not controlled.)

The hidden field indicates whether a relevant channel is accessible by a direct entry (or field, attribute or entity) of a virtual channel number. (When hidden is set to "1", means the channel cannot be accessed by direct entry of the virtual channel number. When set to "0", virtual can be accessed by direct entry.)

The path_select field is a field within the CVCT, which associates a virtual channel with a transmission path of an active channel (The path_select is a 1-bit field in a Cable Virtual Channel table (CVCT) entry that associates a virtual channel with a transmission path of an active channel or when the channel will be active.)

The out_of_band field indicates whether a virtual channel is carried on an out-of-band (OOB) physical transmission channel (The out_of_band is a 1-bit Boolean field in a Cable Virtual Channel table entry that when set to "1" is carried on the out-of-band physical transmission channel. When clear or '0', the virtual channel is carried within a tuned multiplex. When the channel is inactive, out_of_band reflects the channel that will be valid when the channel is again active.)

The hide_guide field indicates whether a relevant channel is accessible by the direct entry (or field, attribute or entity) of the virtual channel number. (When hide_guide is set to "1", means the channel cannot be accessed by direct entry of the virtual channel number. When set to "0", virtual can be accessed by direct entry.)

The service_type field identifies the type of a service set in a virtual channel (The service_type is a 6-bit enumerated field that identifies the type of service set in the virtual channel) Service_type of the panorama service according to an embodiment of the present invention may be designated as a parameterized service (0x07), an extended parameterized service (0x09) and/or a new DTV service panorama service (0x10). The aforementioned service names and values are exemplary and may be set to other names or values.

The source_id field is a 16-bit unsigned integer and indicates a programming source associated with a virtual channel. (A 16-bit unsigned integer number that identifies the programming source associated with the virtual channel. In this context, a source is one specific source of video, text, data, or audio programming Source ID value zero is reserved. Source ID values in the range 0x0001 to 0x0FFF shall be unique within the Transport Stream that carries the VCT, while values 0x1000 to 0xFFFF shall be unique at the regional level. Values for source_ids 0x1000 and above shall be issued and administered by a Registration Authority designated by the ATSC.)

The descriptors_length field signals the length in bytes of the following descriptor field. (The descriptors_length is a 10-bit unsigned integer field that signals the length in bytes of the descriptor field to follow. If there are no descriptors present, zero would be appropriate.)

The descriptor( ) field is a descriptor loop located within the table. The descriptor loop may include an additional descriptor. The panorama_composition_info according to an embodiment of the present invention may be included in the descriptor( ).

FIG. 34 is a diagram illustrating a composition of service_type for the panorama service according to an embodiment of the present invention.

The service_type of the panorama service according to an embodiment of the present invention may be designated as a parameterized service (0x07), an extended parameterized service (0x09) and/or a new DTV service panorama service (0x10). The aforementioned service names and values are exemplary and may be set to other names and values.

When the panorama service according to an embodiment of the present invention is signaled through the parameterized service (0x07), information about the panorama service may be described through a component list descriptor and/or the panorama_composition_info( ).

When the panorama service according to an embodiment of the present invention is signaled through the extended parameterized service (0x09), the information about the panorama service may be described through the component list descriptor, a parameterized service descriptor and/or the panorama_composition_info( ).

When the panorama service according to an embodiment of the present invention is signaled through the new DTV service panorama service (0x10), the information about the panorama service may be described through the panorama_composition_info( ).

FIG. 35 is a diagram illustrating a composition of a component_list_descriptor( ) according to an embodiment of the present invention.

According to an embodiment of the present invention, streams with respect to a panoramic image may be signaled using the component_list_descriptor( ) and the component_list_descriptor( ) according to an embodiment of the present invention may be located at the channel level of a VCT (including the TVCT and CVCT). According to an embodiment of the present invention, each elementary stream with respect to each image included in the service may include stream_info_details( ), and the stream_info_details( ) may signal information about the streams with respect to the panoramic image. In the panorama service according to an embodiment of the present invention, information about each image may be signaled using the stream_info_details( ) according to an embodiment of the present invention even when the stream_type is MPEG2, AVC, HEVC or the like.

The component_list_descriptor( ) according to an embodiment of the present invention may include descriptor_tag, descriptor_length, alternate, component_count, stream_type, format_identifier, length_of_details and/or stream_info_details( ) fields.

The descriptor_tag field may indicate an id for identifying the component_list_descriptor( ).

The descriptor_length field may indicate the length of this descriptor.

The alternate field may indicate whether a relevant instance of the component_list_descriptor is primary information. (A flag that indicates, when set to "1", that this instance of the component_list_descriptor( ) is a second, "alternate" description of streams associated with the virtual channel. When the flag is set to "0" the set of stream types in the instance of the descriptor is the "primary" or "preferred" set. If only one component_list_descriptor( ) appears in the descriptor loop, the value of the alternate flag shall be set to "0".)

The component_count field may indicate the number of components (streams) included in a relevant channel (service). (This 7-bit unsigned integer shall specify the number of components specified in the "for" loop to follow. The value shall be in the range of 1 to 36.)

The stream_type field may indicate the stream type of a relevant component. (This 8-bit unsigned integer field shall indicate the stream_type associated with the component described in this iteration of the "for" loop. Stream types in the range 0xC4 to 0xFF identify stream types defined privately (not described by ATSC Standards).)

The format_identifier field may identify an entity that provides the stream_type value. (This 32-bit unsigned integer shall correspond to the format_identifier in the MPEG2 Registration Descriptor defined in ISO/IEC 138181 [7] Section 2.6.9 and shall identify the entity providing the stream_type value. The value of format_identifier shall be 0x4741 3934 ("GA94" in ASCII) unless the applicable ATSC standard specifies a different value, in which case that value shall be used. The stream_type values defined in ISO/IEC 138181 [7] and whose use is not standardized by ATSC Standards shall use value 0x00000000 for format_identifier.)

The length_of_details field may indicate the length of the following field "stream_info_details( )". (This 8-bit unsigned integer shall specify the length, in bytes, of the defined length of the stream_info_details( ) field to follow. The value of length_of_details shall be set to the length of the stream_info_details( ) field that has been defined for the associated stream_type value. The value shall be in the range of 0 to 246 inclusive.)

The stream_info_details( ) field may indicate detailed information about a relevant component. (This field shall provide further information pertaining to the component identified by the value in the preceding stream_type field. The meaning and structure of the bits contained in stream_info_details( ) shall be as specified in the standard defining the meaning of the value in the stream_type field when used in an ATSC transport stream. If ATSC standards define a stream_info_details( ) structure for a given value of stream_type, the ATSC definition shall take precedence over any definition originating from any other standards developing organization). The stream_info_details( ) field will be described in detail below.

FIG. 36 is a diagram illustrating a composition of the stream_info_details( ) when the stream_type according to an embodiment of the present invention indicates a base stream.

According to an embodiment of the present invention, a panoramic image may be divided into a plurality of elementary streams (ESs) and transmitted. The figure illustrates a composition of stream_info_details( ) for the base stream from among the ESs.

The stream_info_details( ) according to an embodiment of the present invention may include panorama_base_view_profile, panorama_base_view_tier and/or panorama_base_view_level fields.

The panorama_base_view_profile, panorama_base_view_tier and panorama_base_view_level fields may respectively indicate the profile, tier and level information of an image corresponding to the base stream.

FIG. 37 is a diagram illustrating a composition of the stream_info_details( ) when the stream_type according to an embodiment of the present invention indicates a stream other than the base stream.

According to an embodiment of the present invention, a panoramic image may be divided into a plurality of ESs and transmitted. The figure illustrates a composition of stream_info_details( ) for a stream other than the base stream from among the ESs.

The stream_info_details( ) according to an embodiment of the present invention may include panorama_view_profile, panorama_view_tier and/or panorama_view_level fields.

The panorama_view_profile, panorama_view_tier and panorama_view_level fields may respectively indicate the profile, tier and level information of an image corresponding to the stream other than the base stream.

According to another embodiment of the present invention, a panoramic image may be transmitted as one ES. In this case, the component_count field of the aforementioned component_list_descriptor( ) may indicate 1, and thus only one stream_info_details( ) may be used. In this case, the ES with respect to the panoramic image may be signaled through the stream_info_details( ) illustrated in the figure. Here, information indicated by the panorama_view_profile, panorama_view_tier and/or panorama_view_level fields may be the same as the profile, tier and/or level information of the panoramic image.

Figure 38:
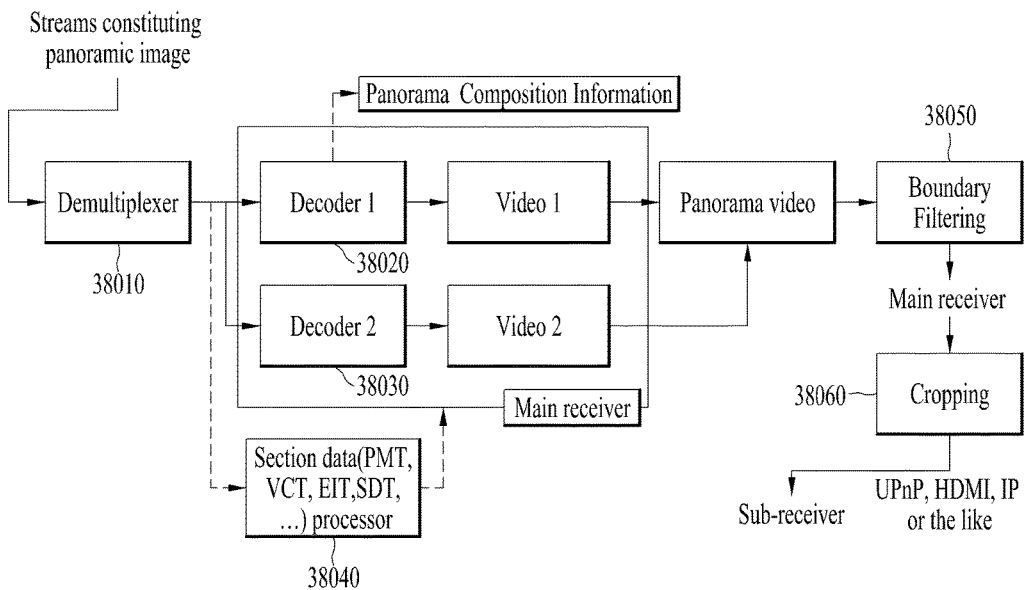
FIG. 38 is a diagram illustrating receiver operation when a main receiver decodes all streams and delivers the decoded streams to a sub-receiver in scenario 1 according to an embodiment of the present invention.

FIG. 38 is a diagram illustrating receiver operation when a main receiver decodes all streams and delivers the decoded streams to a sub-receiver in scenario 1 according to an embodiment of the present invention.

Scenario 1 according to an embodiment of the present invention may transmit a plurality of streams that constitutes a panoramic image to a receiving end.

The receiver according to an embodiment of the present invention may include a demultiplexer 38010, a first decoder 38020, a second decoder 38030, a signaling information processor (section data processor) 38040, a boundary filtering unit 38050 and/or a cropping unit 38060.

The demultiplexer may receive the streams constituting the panoramic image and/or signaling information, extract the streams and/or signaling information and send the extracted streams and/or signaling information to the decoders and/or the signaling information processor 38040.

The decoders (first decoder and/or second decoder) may decode the streams delivered from the demultiplexer to generate divided images (video 1 and/or video 2). Here, the decoders may decode the streams using panorama_composition_information and/or the signaling information processed by the signaling information processor.

The signaling information processor may process the signaling information extracted by the demultiplexer and deliver the processed signaling information to the decoders. Here, the signaling information may include the aforementioned PMT, VCT, EIT and/or SDT.

The boundary filtering unit may restore the panoramic image from the divided images using panorama_filtering_metadata.

The cropping unit may crop the panoramic image, restored by the boundary filtering unit, using extraction_info_metadata and deliver the cropped images to another receiver through UPnP, HDMI and/or IP.

According to an embodiment of the present invention, a receiver that receives and decodes streams constituting a panoramic image may correspond to a main receiver and a receiver that receives a cropped image from the main receiver may correspond to a sub-receiver.

A description will be given of detailed operation of a receiver according to an embodiment of the present invention.

The panorama_composition_info( ) according to an embodiment of the present invention may be received through SEI RBSP (raw byte sequence payload) included in a video element stream. Here, the aforementioned information may be provided through the EIT, SDT or PMT.

The receiver according to an embodiment of the present invention may read a panorama_composition_info SEI message having a nal_unit_type value corresponding to SEI data and a payloadType value of 52 by parsing an HEVC NAL unit. In addition, the receiver may parse panorama_service_type and information about a panoramic image, that is, panorama_resolution, panorama_profile, panorama_level and panorama_tier information, and parse additional information with respect to a scenario according to panorama_service_type.

In scenario 1 according to an embodiment of the present invention, a transmitter may divide the panoramic image into the number of streams indicated by panorama_stream_num such that the streams include images compatible with existing receivers and encode the streams. The receiver according to an embodiment of the present invention may parse panorama_composition_metadata( ) for each elementary stream. An embodiment of the present invention may allow 16:9 DTV receivers to decode and output an image signaled as a base view in sub_video_base_view. When the panoramic image is divided and output using a plurality of DTV receivers, an embodiment of the present invention may allow each DTV receiver to select, decode and output an image based on sub_video_stream_id. According to an embodiment of the present invention, images may be output using priority indicated by the sub_video_priority field.

In scenario 2 according to an embodiment of the present invention, a receiver may decode a panoramic image and separate an image using coordinate values (sub_video_cropping_start_x, sub_video_cropping_start_y) for cropping, included in extraction_info_metadata( ). If a 16:9 DTV receiver crops a part of the panoramic image and outputs the cropped part without resizing the panoramic image, an embodiment of the present invention may separate a base view image through the sub_video_base_view field. If the panoramic image is output using multiple DTV receivers, receivers according to an embodiment of the present invention may decode the image, crop the images according to sub_video_stream_id and output the cropped image.

In scenario 4 according to an embodiment of the present invention, a transmitter may transmit an additional stream with respect to an ROI as an enhancement layer signal. A receiver may acquire width/height information corresponding to resolution of the ROI and/or coordinate information by parsing ROI_info_metadata( ). The receiver may combine the enhancement layer signal with a base layer signal of the panoramic image and/or part of the panoramic image using the acquired information to decode the image. According to an embodiment of the present invention, a high-definition ROI may be delivered to a second device or displayed on the screen of a DTV receiver or part thereof.

In scenario 5 according to an embodiment of the present invention, when a 16:9 event separated from a panoramic image is viewed, a receiver according to an embodiment of the present invention may parse a linkage descriptor with respect to the event when the linkage descriptor is present. The receiver may read advanced_event_linkage_info( ) when the linkage_type field in the linkage descriptor is 0x0F. The receiver according to an embodiment of the present invention may acquire detailed information about the linked panorama broadcast event using the advanced_event_linkage_info( ). The receiver may notify the user that the panorama broadcast service corresponding to the 16:9 event being viewed may be provided using the acquired image. When the user wants to receive the panorama broadcast service, the receiver may receive the panorama broadcast service using the information acquired from the advanced_event_linkage_info( ).

Figure 39:
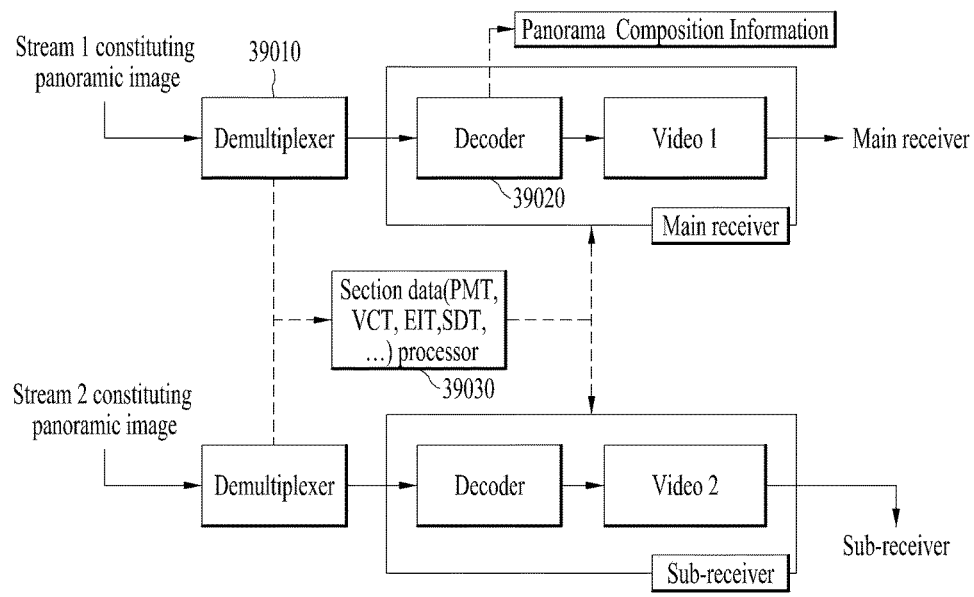
FIG. 39 is a diagram illustrating receiver operation when streams separated and allocated in each receiver are decoded in scenario 1 according to an embodiment of the present invention.

FIG. 39 is a diagram illustrating receiver operation when each receiver decodes a stream separated and allocated thereto in scenario 1 according to an embodiment of the present invention.

Scenario 1 according to an embodiment of the present invention may transmit a plurality of streams constituting a panoramic image to a receiving end.

A receiver according to an embodiment of the present invention may include a demultiplexer 39010, a decoder 39020 and/or a signaling information processor 39030.

The demultiplexer 39010 may receive one of the streams constituting the panoramic image and/or signaling information, extract the received stream and/or signaling information and deliver the extracted stream and/or signaling information to the decoder 39020 and/or the signaling information processor 39030.

The decoder may decode the stream transmitted from the demultiplexer to generate one of images constituting the panoramic image. Here, the decoder may decode the stream using panorama_composition_information and/or the signaling information processed by the signaling information processor.

The signaling information processor may process the signaling information extracted by the demultiplexer and deliver the processed signaling information to the decoder. Here, the signaling information may include the aforementioned PMT, VCT, EIT and/or SDT.

According to an embodiment of the present invention, each receiver that has received a divided stream may decode and display the stream. Here, all receivers may become a main receiver and/or sub-receivers.

Figure 40:
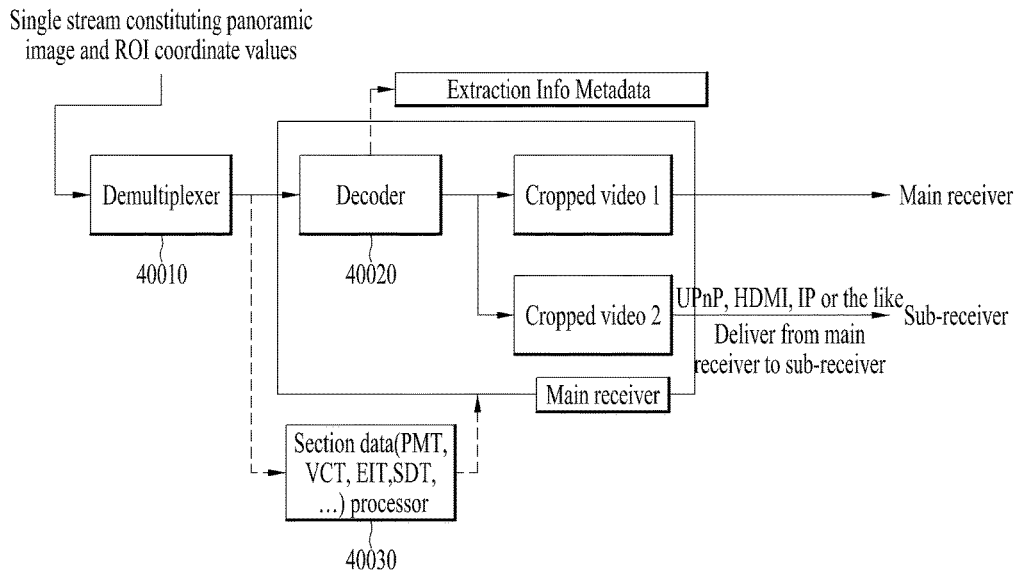
FIG. 40 is a diagram illustrating receiver operation based on scenario 2 according to an embodiment of the present invention.

FIG. 40 is a diagram illustrating receiver operation based on scenario 2 according to an embodiment of the present invention.

Scenario 2 according to an embodiment of the present invention may encode a panoramic image into one stream and deliver the stream to a receiving end.

A receiver according to an embodiment of the present invention may include a demultiplexer 40010, a decoder 40020 and/or a signaling information processor (section data processor) 40030.

The demultiplexer may receive the stream constituting the panoramic image and/or signaling information, extract the received stream and/or signaling information and deliver the extracted stream and/or signaling information to the decoder 40020 and/or the signaling information processor 40030. Here, the demultiplexer may receive extraction_info_metadata for cropping the panoramic image.

The decoder may decode the stream delivered from the demultiplexer to generate the panoramic image. Here, the decoder may decode the stream using the signaling information processed by the signaling information processor. The decoder may crop the panoramic image using the received extraction_info_metadata.

The signaling information processor may process the signaling information extracted by the demultiplexer and deliver the processed signaling information to the decoder.

Here, the signaling information may include the aforementioned PMT, VCT, EIT and/or SDT.

According to an embodiment of the present invention, cropped images (cropped video 1 and cropped video 2) may be delivered to a main receiver and/or a sub-receiver through UPnP, HDMI and/or IP.

According to an embodiment of the present invention, a receiver that receives the stream constituting the panoramic image may correspond to a main receiver and other receivers may correspond to sub-receivers.

Figure 41:
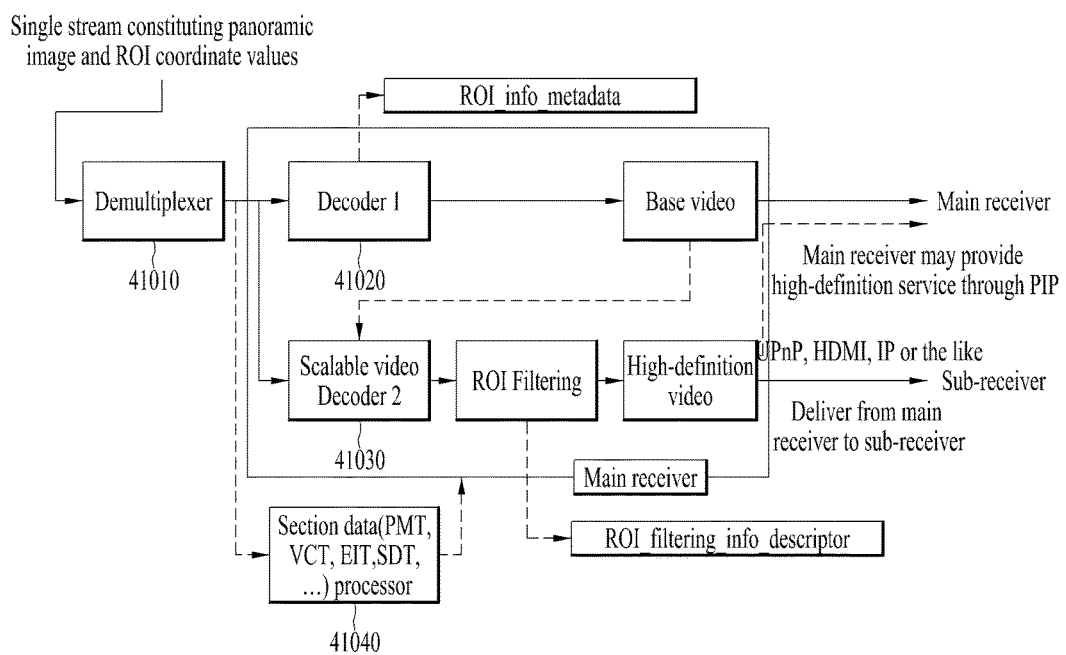
FIG. 41 is a diagram illustrating receiver operation when a main receiver decodes all streams and delivers the decoded streams to a sub-receiver in scenario 4 according to an embodiment of the present invention.
Figure 42:
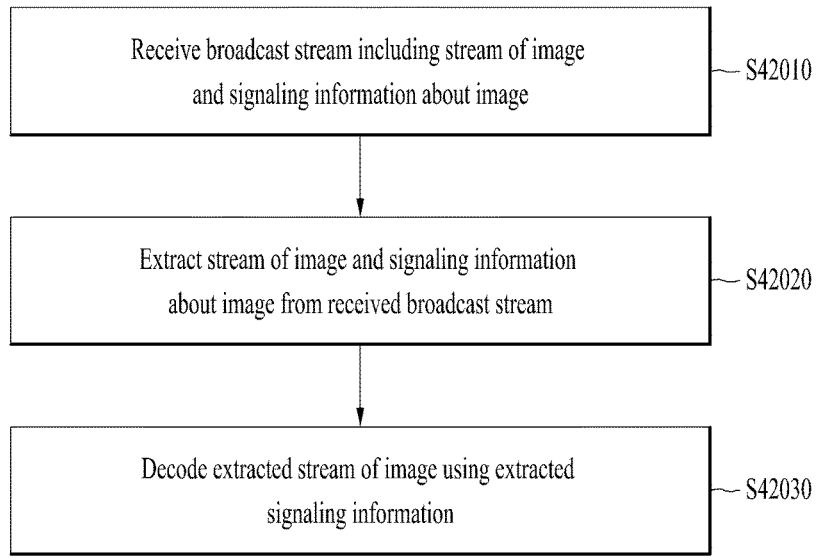
FIG. 42 is a diagram illustrating a broadcast signal reception method according to an embodiment of the present invention.

FIG. 41 is a diagram illustrating receiver operation when a main receiver decodes all streams and delivers the decoded streams to sub-receivers on the basis of scenario 4 according to an embodiment of the present invention.

Scenario 4 according to an embodiment of the present invention may provide enhancement data of part of a panoramic image through an enhancement layer using SHVC and provide signaling information thereon for provision of a high-definition service for an ROI.

A receiver according to an embodiment of the present invention may include a demultiplexer 41010, a first decoder (decoder 1) 41020, a second decoder (scalable video decoder 2) 41030, a signaling information processor (section data processor) 41040 and/or an ROI filtering unit 41050.

The demultiplexer may receive all streams constituting a panoramic image and/or signaling information, extract the streams and/or the signaling information and deliver the extracted streams and/or signaling information to the decoders and/or the signaling information processor 41040.

The first decoder may decode a base layer stream delivered from the demultiplexer to generate a base video image (base video). Here, the first decoder may decode the base layer stream using ROI_info_metadata and/or the signaling information processed by the signaling information processor.

The second decoder may decode an enhancement layer stream delivered from the demultiplexer to generate a high-definition video image. Here, the second decoder may receive the base video image signal from the first decoder and decode the enhancement layer stream using the received base video image signal received and/or the signaling information processed by the signaling information processor.

The signaling information processor may process the signaling information extracted by the demultiplexer and deliver the processed signaling information to the decoders. Here, the signaling information may include the aforementioned PMT, VCT, EIT and/or SDT.

The ROI filtering unit may filter an ROI to merge an enhancement layer signal of the ROI with a base layer signal. Here, the ROI filtering unit may filter the ROI using ROI_filtering_info_descriptor.

According to an embodiment of the present invention, the generated high-definition video image may be delivered to a main receiver and/or a sub-receiver through UPnP, HDMI and/or IP. The main receiver may provide a high-definition service through PIP.

According to an embodiment of the present invention, a receiver that receives and decodes the base layer stream and/or the enhancement layer stream of the panoramic image may correspond to the main receiver and a receiver that receives the high-definition video image from the main receiver may correspond to the sub-receiver.

According to an embodiment of the present invention, while the main receiver may output the base layer signal and the sub-receiver may provide the high-definition service, the main receiver may provide the high-definition service and the sub-receiver may output the base layer signal.

Distinguished from the embodiment of the present invention, in which a main receiver decodes all streams constituting a panoramic image, according to another embodiment of the present invention, a sub-receiver may receive and decode the base layer signal, and decode and/or display the image of an ROI using a scalable video decoder thereof.

A receiver according to an embodiment of the present invention may receive a broadcast stream including a stream with respect to an image and signaling information about the image (S42010). Here, the signaling information may include signaling information about a panoramic image. A demultiplexer according to an embodiment of the present invention may extract the stream with respect to the image and the signaling information about the image from the received broadcast stream (S42020). A decoder according to an embodiment of the present invention may decode the stream with respect to the image using the extracted signaling information (S42030).

According to another embodiment of the present invention, the signaling information about the image may include event connection information that indicates information about a panorama broadcast service corresponding to a currently viewed broadcast service, and the signaling information about the panoramic image may include panorama composition information indicating the composition of the panoramic image, which has been described in detail with reference to FIGS. 17 and 30.

According to another embodiment of the present invention, the aforementioned image may be divided into one or more images, the stream with respect to the image may include streams with respect to the one or more divided images, and the decoder may decode the streams with respect to the divided images using the extracted signaling information, which has been described in detail with reference to FIGS. 2, 6, 7, 38 and 39.

According to an embodiment of the present invention, the aforementioned broadcast stream may include a stream with respect to additional information on an ROI of a user, in the image, for providing a high-definition image of the ROI, the demultiplexer may extract the stream with respect to the image, the stream with respect to the additional information on the ROI and the signaling information about the image from the received broadcast stream, and the decoder may decode the extracted stream with respect to the image and/or the extracted stream with respect to the additional information on the ROI using the extracted signaling information, which has been described with reference to FIGS. 5, 16 and 41.

According to another embodiment of the present invention, the panorama composition information may include information about the divided images, which has been described with reference to FIGS. 17, 19 and 20.

According to another embodiment of the present invention, the panorama composition information may include filtering information for removing blocking artifacts from the divided images, which has been described with reference to FIGS. 17 and 22.

According to another embodiment of the present invention, the panorama composition information may include information for cropping the panoramic image into one or more images, which has been described with reference to FIGS. 3, 8, 17, 23, 38 and 40

According to another embodiment of the present invention, the panorama composition information may include information about the image of the aforementioned ROI, which has been described with reference to FIGS. 17, 25 and 41.

According to another embodiment of the present invention, the broadcast signal reception method may include a step of displaying the decoded image stream and, in the display step, a region shifted according to a scrolling request may be displayed when the scrolling request is received from the user, which has been described with reference to FIGS. 4, 9 and 10 to 15.

Figure 43:
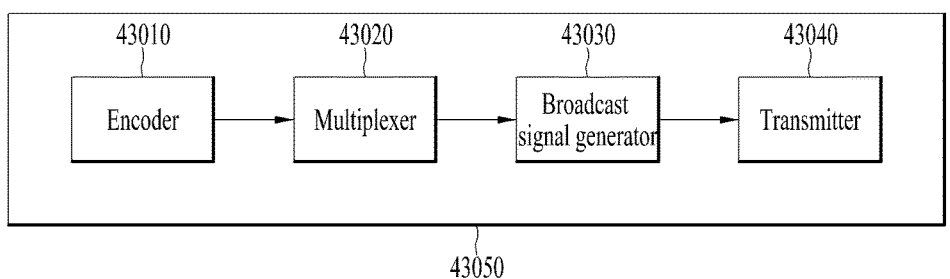
FIG. 43 is a diagram illustrating a configuration of a broadcast signal transmission apparatus according to an embodiment of the present invention.

FIG. 43 is a diagram illustrating a configuration of a broadcast signal transmission apparatus according to an embodiment of the present invention.

A broadcast signal transmission apparatus 43050 according to an embodiment of the present invention may include an encoder 43010 for encoding an image, a multiplexer 43020 for multiplexing the encoded image and signaling information about the image into one broadcast stream, a broadcast signal generator 43030 for generating a broadcast signal including the multiplexed broadcast stream and/or a transmitter 43040 for transmitting the generated broadcast signal. Here, the signaling information may include signaling information about a panoramic image.

The encoder 43010 according to an embodiment of the present invention may encode an image. The multiplexer 43020 according to an embodiment of the present invention may multiplex the encoded image and signaling information about the image into one broadcast stream. Here, the signaling information may include signaling information about a panoramic image. The broadcast signal generator 43030 according to an embodiment of the present invention may generate a broadcast signal including the multiplexed broadcast stream. The transmitter 43040 according to an embodiment of the present invention may transmit the generated broadcast signal. Here, the transmitter may transmit the broadcast signal through a terrestrial broadcast network, the Internet and/or a cable network.

The encoder, the multiplexer, the broadcast signal generator and/or the transmitter according to an embodiment of the present invention may correspond to hardware devices performing the aforementioned operations. That is, the encoder, the multiplexer, the broadcast signal generator and/or the transmitter according to an embodiment of the present invention may correspond to processors that execute instructions stored in a memory.

Figure 44:
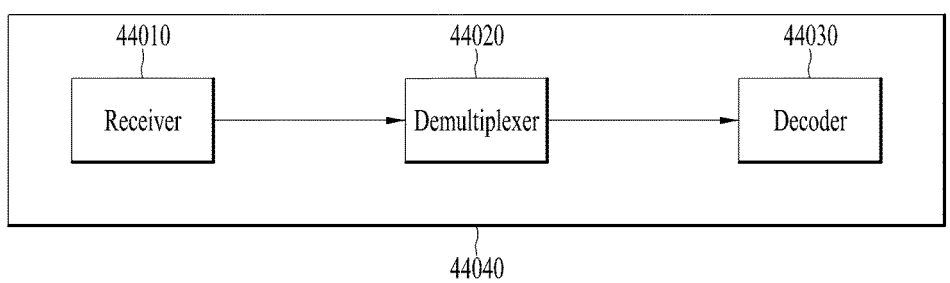
FIG. 44 is a diagram illustrating a configuration of a broadcast signal reception apparatus according to an embodiment of the present invention.

FIG. 44 is a diagram illustrating a configuration of a broadcast signal reception apparatus according to an embodiment of the present invention.

A broadcast signal reception apparatus 44040 according to an embodiment of the present invention may include a receiver 44010 for receiving a broadcast stream including a stream with respect to an image and signaling information about the image, a demultiplexer 44020 for extracting the stream with respect to the image and the signaling information about the image from the received broadcast stream and/or a decoder 44030 for decoding the extracted stream with respect to the image using the extracted signaling information.

The receiver 44010 according to an embodiment of the present invention may receive a broadcast stream including a stream with respect to an image and signaling information about the image. Here, the signaling information may include signaling information about a panoramic image. The demultiplexer 44020 according to an embodiment of the present invention may extract the stream with respect to the image and the signaling information about the image from the received broadcast stream. The decoder 44030 according to an embodiment of the present invention may decode the extracted stream with respect to the image using the extracted signaling information.

The receiver, the demultiplexer and/or the decoder according to an embodiment of the present invention may correspond to hardware devices performing the aforementioned operations. That is, the receiver, the demultiplexer and/or the decoder according to an embodiment of the present invention may correspond to processors that execute instructions stored in a memory.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The image processing methods according to the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

MODE FOR INVENTION

Various embodiments have been described in the best mode for carrying out the invention.

INDUSTRIAL APPLICABILITY

The present invention is applicable to the broadcast industry.

The invention claimed is:

1. A method for transmitting a broadcast signal by an apparatus for transmitting a broadcast signal, comprising:
   encoding an original panoramic image, wherein the original panoramic image is divided into two or more images and wherein each divided image is encoded and carried by a video stream, respectively;
   multiplexing the divided images and signaling information about the original panoramic image and the divided images into a single broadcast stream;
   generating a broadcast signal including the multiplexed broadcast stream; and
   transmitting the generated broadcast signal, wherein the signaling information includes resolution information of the original panoramic image, information indicating a number of video stream carrying the divided images and composition information of the original panoramic image, wherein the composition information of the original panoramic image includes resolution information of each divided image carried by the video stream, and wherein the signaling information further includes an active format description which includes start coordinate values of an active portion belonging to the divided images and the active portion is a partial image of the divided image to be displayed.

2. The method according to claim 1, wherein the signaling information about the image includes event connection information indicating information about a panorama broadcast service corresponding to a currently viewed broadcast service.

3. The method according to claim 2, wherein the signaling information further includes information for cropping the original panoramic image into one or more images.

4. The method according to claim 2, wherein the encoding comprises encoding additional information on a region of interest (ROI) of a user in the original panoramic image, for providing a high-definition image of the ROI, and the multiplexing comprises multiplexing the encoded original panoramic image, the signaling information about the original panoramic image and the encoded ROI additional information into a single broadcast stream.

5. The method according to claim 4, wherein the signaling information further includes information about the image of the ROI.

6. The method according to claim 1, wherein the signaling information further includes filtering information for removing blocking artifacts from the divided images.

7. A method for receiving a broadcast signal by an apparatus for receiving a broadcast signal, comprising:

receiving a broadcast stream including two or more video streams carrying divided images of an original panoramic image and signaling information about the original panoramic image and the divided images;

extracting the video streams and the signaling information about the original panoramic image and the divided images from the received broadcast stream; and decoding the extracted video streams using the extracted signaling information, wherein the signaling information includes resolution information of the original panoramic image, information indicating a number of video stream carrying the divided images and composition information of the original panoramic image, wherein the composition information of the original panoramic image includes resolution information of each divided image carried by the video stream, and wherein the signaling information further includes an active format description which includes start coordinate values of an active portion belonging to the divided images and the active portion is a partial image of the divided image to be displayed.

8. The method according to claim 7, wherein the signaling information about the image includes event connection information indicating information about a panorama broadcast service corresponding to a currently viewed broadcast service.

9. The method according to claim 8, wherein the decoding comprises respectively decoding the video streams using the extracted signaling information.

10. The method according to claim 9, wherein the signaling information further includes filtering information for removing blocking artifacts from the divided images.

11. The method according to claim 8, wherein the broadcast stream includes a stream with respect to additional information on an ROI of a user in the original panoramic image, for providing a high-definition image of the ROI, wherein the extracting comprises extracting the video streams the stream with respect to the ROI additional information and the signaling information about the original panoramic image and the divided images from the received broadcast stream, and the decoding comprises decoding the extracted video streams and the extracted stream with respect to the ROI additional information using the extracted signaling information.

12. The method according to claim 11, wherein the signaling information further includes information about the image of the ROI.

13. The method according to claim 8, wherein the signaling information further includes information for cropping the original panoramic image into one or more images.

14. The method according to claim 7, further comprising displaying the decoded video streams with respect to the image, wherein the displaying comprises displaying a region shifted according to a scrolling request when the scrolling request is received from a user.

15. An apparatus for transmitting a broadcast signal, comprising:

an encoder for encoding an original panoramic image, wherein the original panoramic image is divided into two or more images and wherein each divided image is encoded and carried by a video stream, respectively;

a multiplexer for multiplexing the divided images and signaling information about the original panoramic image and the divided images into a single broadcast stream;

a broadcast signal generator for generating a broadcast signal including the multiplexed broadcast stream; and a transmitter for transmitting the generated broadcast signal, wherein the signaling information includes resolution information of the original panoramic image, information indicating a number of video stream carrying the divided images and composition information of the original panoramic image, wherein the composition information of the original panoramic image includes resolution information of each divided image carried by the video stream, and wherein the signaling information further includes an active format description which includes start coordinate values of an active portion belonging to the divided images and the active portion is a partial image of the divided image to be displayed.

16. An apparatus for receiving a broadcast signal, comprising:

a receiver for receiving a broadcast stream including two or more video streams carrying divided images of an original panoramic image and signaling information about the original panoramic image and the divided images;

a demultiplexer for extracting the video streams and the signaling information about the original panoramic image and the divided images from the received broadcast stream; and a decoder for decoding the extracted video streams using the extracted signaling information, wherein the signaling information includes resolution information of the original panoramic image, information indicating a number of video stream carrying the divided images and composition information of the original panoramic image, wherein the composition information of the original panoramic image includes resolution information of each divided image carried by the video stream, and wherein the signaling information further includes an active format description which includes start coordinate values of an active portion belonging to the divided images and the active portion is a partial image of the divided image to be displayed.

* * * * *